US012326247B2

(12) United States Patent
Yan et al.

(10) Patent No.: US 12,326,247 B2
(45) Date of Patent: Jun. 10, 2025

(54) LIGHT TUBES, LIGHT FIXTURES, AND LIGHT BODIES

(71) Applicant: HANGZHOU HANGKE OPTOELECTRONICS CO., LTD., Zhejiang (CN)

(72) Inventors: Qianjun Yan, Hangzhou (CN); Zhaozhang Zheng, Hangzhou (CN); Jun Li, Hangzhou (CN); Hai Wang, Hangzhou (CN)

(73) Assignee: HANGZHOU HANGKE OPTOELECTRONICS CO., LTD., Hangzhou (CN)

( * ) Notice: Subject to any disclaimer, the term of this patent is extended or adjusted under 35 U.S.C. 154(b) by 0 days.

(21) Appl. No.: 18/659,050

(22) Filed: May 9, 2024

(65) Prior Publication Data

US 2024/0288144 A1 Aug. 29, 2024

Related U.S. Application Data

(63) Continuation-in-part of application No. PCT/CN2023/106875, filed on Jul. 12, 2023.

(30) Foreign Application Priority Data

Jan. 19, 2023 (CN) ......................... 202320181256.1
Mar. 24, 2023 (CN) ......................... 202310303248.4

(51) Int. Cl.
*F21V 3/02* (2006.01)
*F21S 4/26* (2016.01)
(Continued)

(52) U.S. Cl.
CPC *F21V 3/02* (2013.01); *F21S 4/26* (2016.01); *F21V 3/049* (2013.01); *F21V 3/12* (2018.02);
(Continued)

(58) Field of Classification Search
CPC .. F21S 4/26; F21V 3/049; F21V 17/12; F21V 23/06
See application file for complete search history.

(56) References Cited

U.S. PATENT DOCUMENTS 8,944,669 B2 * 2/2015 Chien .................... G03B 15/03
362/249.02
10,876,689 B1 * 12/2020 Bowser ..................... F21V 9/30
(Continued)

FOREIGN PATENT DOCUMENTS

CN 206738970 U 12/2017
CN 209819248 U 12/2019
(Continued)

OTHER PUBLICATIONS

English translation of Yin CN-217928420-U (Year: 2022).*
(Continued)

*Primary Examiner* — Evan P Dzierzynski
(74) *Attorney, Agent, or Firm* — Porus IP LLC

(57) ABSTRACT

Disclosed is a light tube, a light fixture, and a light body. The light tube comprises at least one tube member and at least one flexible filament. The tube member includes a light-transmitting tube and one or more inner layers. The at least one flexible filament penetrates into the tube member. The light fixture comprises a light holder and the light tube. The at least one tube member includes a sealed end and a connecting end. The at least one tube member is mounted on the light holder. The light body comprises the light tube and a light cap. The light cap is fixedly connected with the connecting end of the at least one tube member. A drive power board is disposed in the light cap. Positive and negative pins of the drive power board are electrically connected with a top end and a side end of the light cap, respectively.

6 Claims, 29 Drawing Sheets

(51) Int. Cl.

| | |
|---|---|
| ***F21V 3/04*** | (2018.01) |
| ***F21V 3/12*** | (2018.01) |
| ***F21V 17/12*** | (2006.01) |
| ***F21V 21/06*** | (2006.01) |
| ***F21V 23/00*** | (2015.01) |
| ***F21V 23/04*** | (2006.01) |
| *F21Y 113/00* | (2016.01) |
| *F21Y 115/10* | (2016.01) |

(52) U.S. Cl.
CPC .............. *F21V 17/12* (2013.01); *F21V 21/06* (2013.01); *F21V 23/002* (2013.01); *F21V 23/04* (2013.01); *F21Y 2113/00* (2013.01); *F21Y 2115/10* (2016.08)

(56) References Cited

U.S. PATENT DOCUMENTS

| | | | | |
|---|---|---|---|---|
| 2004/0179372 | A1* | 9/2004 | Guerrieri | G02B 6/001 362/555 |
| 2009/0141515 | A1* | 6/2009 | Wu | G02B 6/001 362/555 |
| 2015/0124931 | A1* | 5/2015 | Foellmer | H01J 35/165 445/28 |
| 2016/0369952 | A1 | 12/2016 | Weekamp | |
| 2017/0299133 | A1* | 10/2017 | Kuo | F21V 15/01 |
| 2018/0283674 | A1* | 10/2018 | Huang | F21K 9/232 |
| 2020/0124236 | A1* | 4/2020 | Jiang | F21V 7/005 |
| 2020/0182413 | A1* | 6/2020 | Jiang | H05B 45/20 |

FOREIGN PATENT DOCUMENTS

| | | | |
|---|---|---|---|
| CN | 210831516 U | | 6/2020 |
| CN | 214249221 U | | 9/2021 |
| CN | 217928420 U | * | 11/2022 |

OTHER PUBLICATIONS

International Search Report in PCT/CN2023/106875 mailed on Sep. 27, 2023, 8 pages.

Written Opinion in PCT/CN2023/106875 mailed on Sep. 27, 2023, 5 pages.

* cited by examiner

LIGHT TUBES, LIGHT FIXTURES, AND LIGHT BODIES

CROSS-REFERENCE TO RELATED APPLICATIONS

This application is a continuation-in-part of International Application No. PCT/CN2023/106875, filed on Jul. 12, 2023, which claims priority to Chinese Application No. CN202320181256.1, filed on Jan. 19, 2023, and Chinese Application No. CN202310303248.4, filed on Mar. 24, 2023, the entire contents of each of which are incorporated herein by reference.

TECHNICAL FIELD

The present disclosure relates to the field of lighting technology, and in particular, to a light tube, a light fixture, and a light body.

BACKGROUND

In many homes, entertainment and leisure, dining, or shopping occasions, light fixtures are increasingly used as decorative amenities that create ambiance and beautify the environment. In order to meet the increasingly diverse decorative needs and facilitate customized decorations, a wide range of ambient lighting has been introduced in the market to users to choose appropriate styles of ambient lighting for different decorative purposes.

Traditional light fixtures are equipped with light strips in the light tubes with a light homogenizing function, making the dispersed light more uniform. However, the light strip emits light from only one side, and the back of the light-emitting surface does not emit light. If it is necessary to make the entire circumference of the light tube emit light, at least two light strips need to be mounted, and the back sides of the two light strips need to be oppositely disposed with the light-emitting surfaces radially facing outward, which greatly increases the production difficulty and cost. In addition, with the development of industrial design, the monotonous styling of traditional light fixtures no longer meets the aesthetic requirements of consumers.

Therefore, the present disclosure provides a light tube, a light fixture, and a light body capable of presenting various lighting effects and different stylings, achieving a wide range of applicable scenarios.

SUMMARY

One or more embodiments of the present disclosure provide a light tube comprising a tube member and at least one flexible filament. The tube member may include a light-transmitting tube and one or more inner layers. The one or more inner layers may be disposed in the light-transmitting tube. The one or more inner layers may include at least one of a diffusion tube, an inner refraction layer, or an inner diffuse reflection layer. The tube member may have a regular or irregular shape. The at least one flexible filament may penetrate into the tube member.

In some embodiments, the one or more may include two or more inner layers.

In some embodiments, the inner diffuse reflection layer may include a first coating layer or a first micro-rough layer. The inner refraction layer may include a plurality of first refraction surfaces. The plurality of first refraction surfaces may be distributed on an inner wall of the light-transmitting tube.

In some embodiments, an outer wall of the light-transmitting tube may be provided with a coated layer, an outer refraction layer, or an outer diffuse reflection layer. The outer refraction layer may include a plurality of second refraction surfaces. The plurality of second refraction surfaces may be distributed on the outer wall of the light-transmitting tube. The outer diffuse reflection layer may include a second coating layer or a second micro-rough layer.

In some embodiments, the at least one flexible filament may include a first conductive contact, a second conductive contact, a flexible substrate, and a plurality of light-emitting diode (LED) chips. The plurality of LED chips may be distributed on the flexible substrate and connected in series and/or parallel. A fluorescent adhesive layer may be coated outside the flexible substrate to form a filament body. The first conductive contact and the second conductive contact may be disposed at one end of the filament body or disposed at two ends of the filament body, respectively. The plurality of LED chips may be connected to a power supply through the first conductive contact and the second conductive contact to form a circuit.

In some embodiments, the diffusion tube may sleeve the light-transmitting tube. The diffusion tube may include at least one of a colored plastic tube, a fluorescent plastic tube, a frosted plastic tube, or a heat-shrinkable tube. The light-transmitting tube may include at least one of a silicone tube, a glass tube, or a plastic tube.

In some embodiments, the inner wall of the light-transmitting tube and/or an outer wall of the diffusion tube may be a non-smooth surface.

In some embodiments, a wall thickness of the light-transmitting tube may be within a range of 5 mm-20 mm. A hole diameter of the light-transmitting tube may be within a range of 3 mm-10 mm. A wall thickness of the diffusion tube may be within a range of 0.1 mm-3 mm. The wall thickness of the light-transmitting tube may be greater than or equal to ⅕ of an outer diameter of the light-transmitting tube. A thickness of a gap between the outer wall of the diffusion tube and the inner wall of the light-transmitting tube may be within a range of 0.1 mm-10 mm.

One or more embodiments of the present disclosure provide a light fixture comprising a light holder and a light tube. The light tube may include at least one flexible filament and at least one tube member. The at least one tube member may include a sealed end and a connecting end. The sealed end may be connected with a plug. The at least one tube member may be mounted on the light holder through the connecting end.

In some embodiments, a mounting cavity may be disposed in the light holder. At least one stepped through hole may be disposed in an upper end of the mounting cavity. The at least one stepped through hole may be communicated with the mounting cavity. The connecting end of the at least one tube member may be fixedly connected with the stepped through hole through a connecting sleeve.

In some embodiments, the connecting sleeve may be a stepped sleeve. A hole diameter of an axial upper end of the connecting sleeve may match a diameter of the connecting end of the tube member. An axial lower end of the connecting sleeve may extend into the mounting cavity through the stepped through hole. The connecting sleeve may be fixedly connected with the stepped through hole. The at least one flexible filament may penetrate through the connecting sleeve and the light holder via a cable to be electrically connected with a power cord outside the light holder.

In some embodiments, a threading hole communicated with the mounting cavity may be disposed on the light holder. A rubber sleeve may be connected in the threading hole. The at least one flexible filament may penetrate through the rubber sleeve via the cable to be electrically connected with the power cord outside the light holder.

In some embodiments, the light fixture may include a chassis and a mounting sleeve. A lower end of the mounting sleeve may be fixedly connected with the chassis. The connecting end of the at least one tube member may be sleeved with an upper end of the mounting sleeve. A threading through hole communicated with an inner hole of the mounting sleeve may be disposed in a radial direction of the mounting sleeve. A threading rubber sleeve may be disposed in the threading through hole. The at least one flexible filament may penetrate through the mounting sleeve via the cable to be electrically connected with the power cord through the threading rubber sleeve.

In some embodiments, the light fixture may further comprise a connecting sleeve. A lower end of the connecting sleeve may be provided with outer threads. An upper inner hole of the connecting sleeve may be provided with a stepped sleeve hole. The connecting end of the tube member may be fixedly connected with the stepped sleeve hole. An upper inner hole of the mounting sleeve may be provided with inner threads. The lower end of the connecting sleeve may be screwed with the inner threads in the upper inner hole of the mounting sleeve.

In some embodiments, a length of the mounting sleeve may be greater than or equal to 50 cm. The mounting sleeve may be composed of a plurality of short sleeves connected in sequence. The threading through hole may be disposed in tube walls of the plurality of short sleeves of a lower section of the mounting sleeve.

In some embodiments, the light fixture may comprise a base. A drive power board and a power storage module may be disposed in the base. The connecting end of the at least one tube member may be mounted on the base. The at least one flexible filament may penetrate through the base via the cable to be electrically connected with the drive power board. The power storage module may be electrically connected with the drive power board.

In some embodiments, a switch may be disposed on an outer wall of the base. The switch may be electrically connected on a circuit formed by the power storage module, the drive power board, and the at least one flexible filament.

In some embodiments, the light fixture may comprise a hanging base. At least one end of the sealed end and the connecting end of the at least one tube member may be connected with the hanging base.

In some embodiments, the light fixture may comprise the hanging base and at least one hanging sling. The at least one tube member may be hung below the hanging base through the at least one hanging sling.

One or more embodiments of the present disclosure provide a light body comprising a light tube and a light cap. The light tube may include at least one flexible filament and at least one tube member. The light cap may be fixedly connected with a connecting end of the at least one tube member. A drive power board may be disposed in the light cap. The at least one flexible filament may be electrically connected with the drive power board. A positive pin and a negative pin of the drive power board may be electrically connected with a top end and a side end of the light cap, respectively.

BRIEF DESCRIPTION OF THE DRAWINGS

The present disclosure will be further illustrated by way of exemplary embodiments, which will be described in detail with reference to the accompanying drawings. These embodiments are not limiting, and in these embodiments, the same numbering denotes the same structure, wherein.

DETAILED DESCRIPTION

Figure 1:
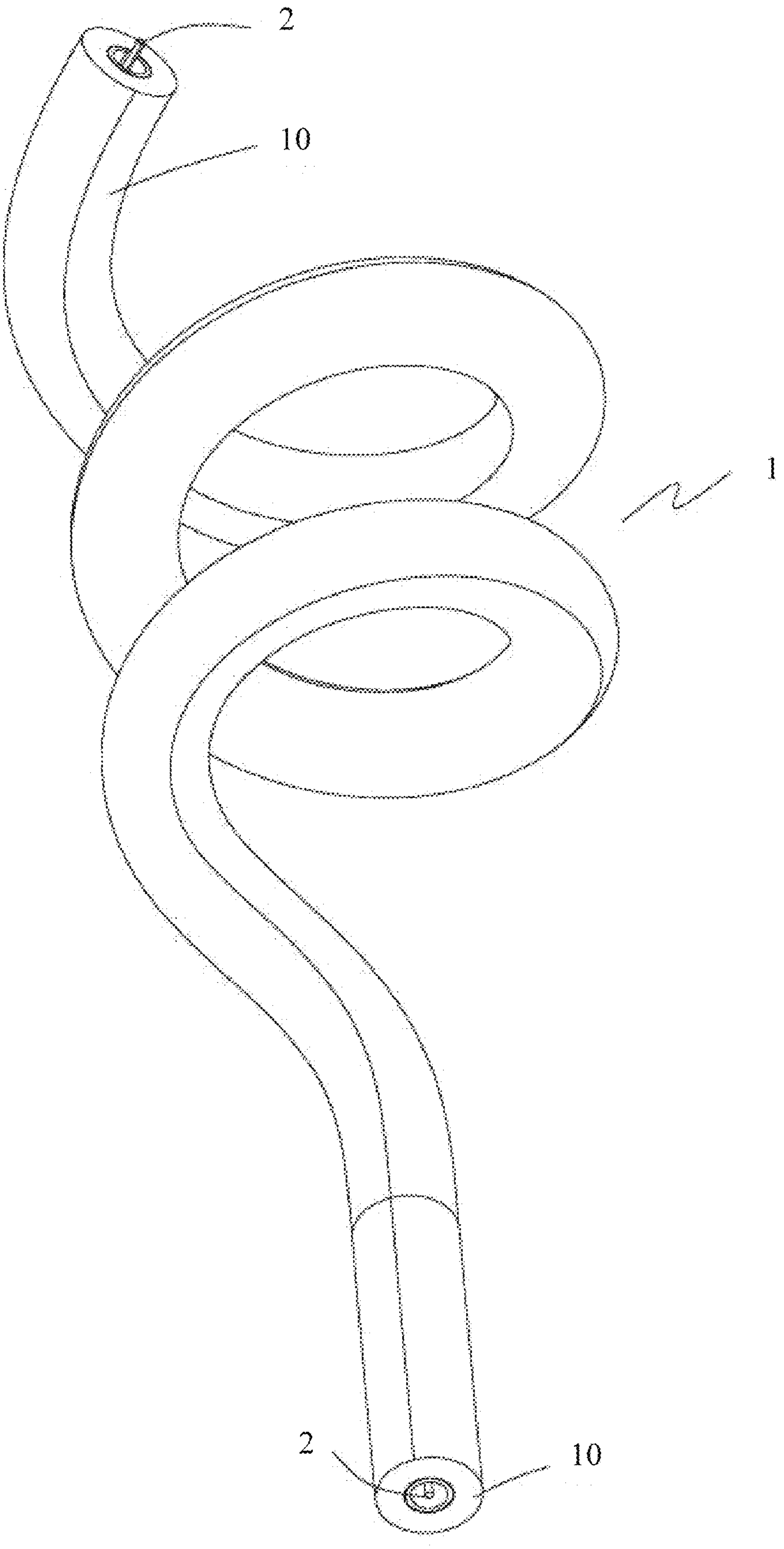
FIG. 1 is a schematic diagram illustrating a three-dimensional structure of an exemplary light tube according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit", and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

FIG. 1 is a schematic diagram illustrating a three-dimensional structure of an exemplary light tube according to some embodiments of the present disclosure.

Some embodiments of the present disclosure provide a light tube. In some embodiments, as illustrated n in FIG. 1, the light tube may include a tube member 1 and at least one flexible filament 2. The tube member 1 may include a light-transmitting tube 10 and one or more inner layers. The one or more inner layers may be disposed in the light-transmitting tube 10. In some embodiments, the one or more inner layers may include at least one of a diffusion tube 11, an inner refraction layer 15, or an inner diffuse reflection layer 13. In some embodiments, the tube member 1 may be a regular or irregular shape. In some embodiments, the at least one flexible filament 2 may penetrate into the tube member 1.

The tube member 1 refers to a tubular structural member configured to support and shape the light tube. In some embodiments, a shape of the tube member 1 may be altered by thermoplastic molding, which makes the tube member 1 more aesthetically pleasing and exhibits a three-dimensional effect. In some embodiments, the tube member 1 may be thermally bent and molded into the regular or irregular shape, such as a tubular spiral shape, a wavy shape, a ring shape, a U shape, etc. The tube member 1 may present a smooth and graceful three-dimensional figure through different curve designs, so that a light fixture including the tube member 1 may have artistic beauty. For example, as illustrated in FIG. 1, the tube member 1 may be shaped as a tubular spiral structure.

In some embodiments, the tube member 1 may include the light-transmitting tube 10 and the one or more inner layers.

Figure 2:
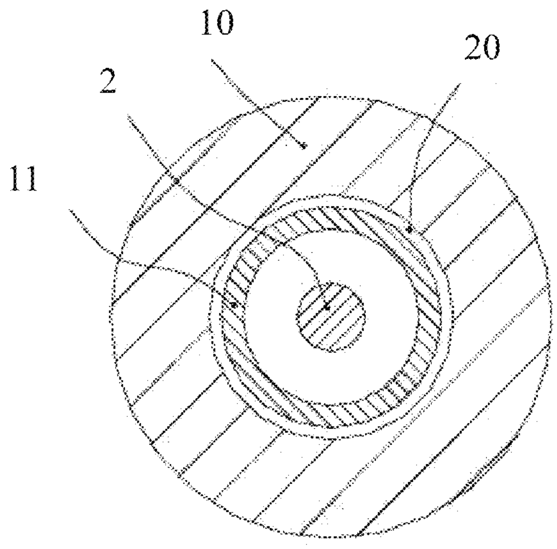
FIG. 2 is a schematic diagram illustrating a cross section of an exemplary light tube according to some embodiments of the present disclosure.
Figure 3:
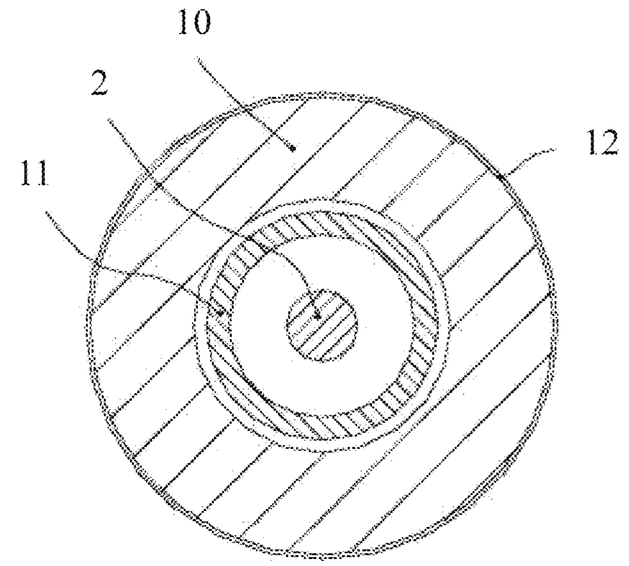
FIG. 3 is a schematic diagram illustrating a cross section of an exemplary light tube according to some embodiments of the present disclosure.
Figure 4:
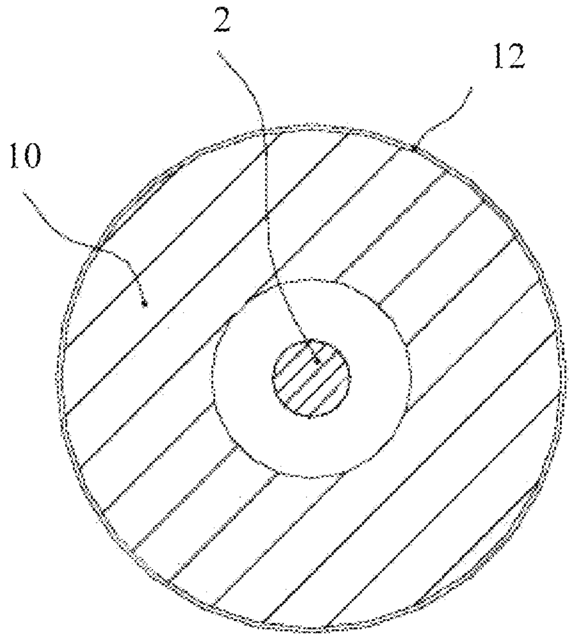
FIG. 4 is a schematic diagram illustrating a cross section of an exemplary light tube according to some embodiments of the present disclosure.
Figure 5:
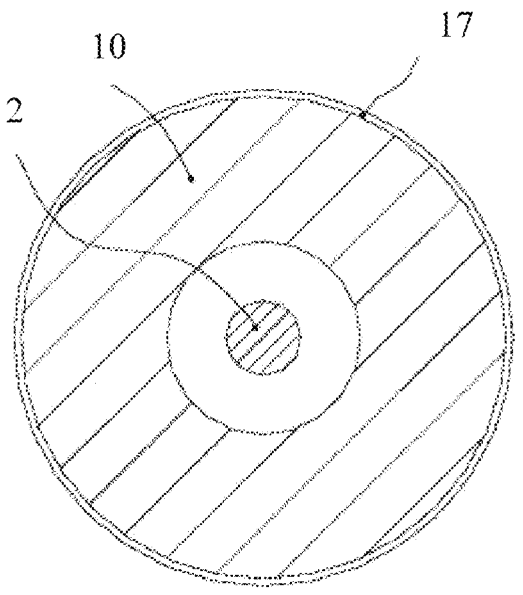
FIG. 5 is a schematic diagram illustrating a cross section of an exemplary light tube according to some embodiments of the present disclosure.
Figure 6:
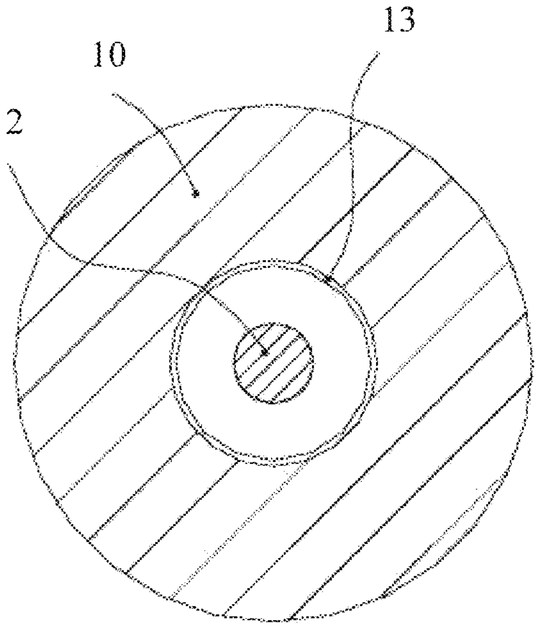
FIG. 6 is a schematic diagram illustrating a cross section of an exemplary light tube according to some embodiments of the present disclosure.
Figure 7:
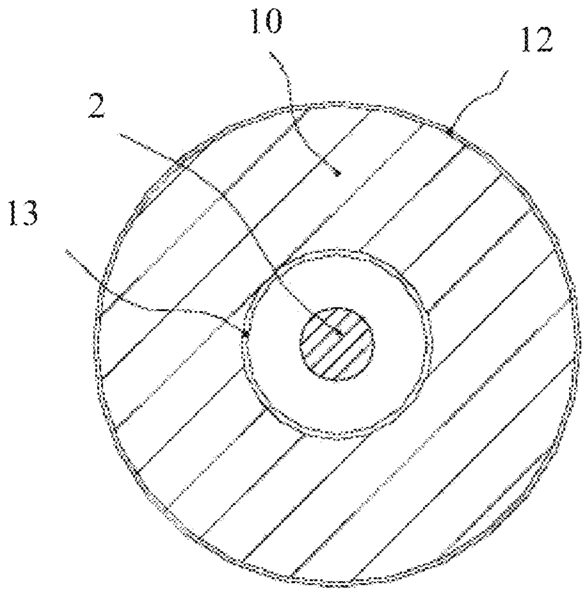
FIG. 7 is a schematic diagram illustrating a cross section of an exemplary light tube according to some embodiments of the present disclosure.
Figure 8:
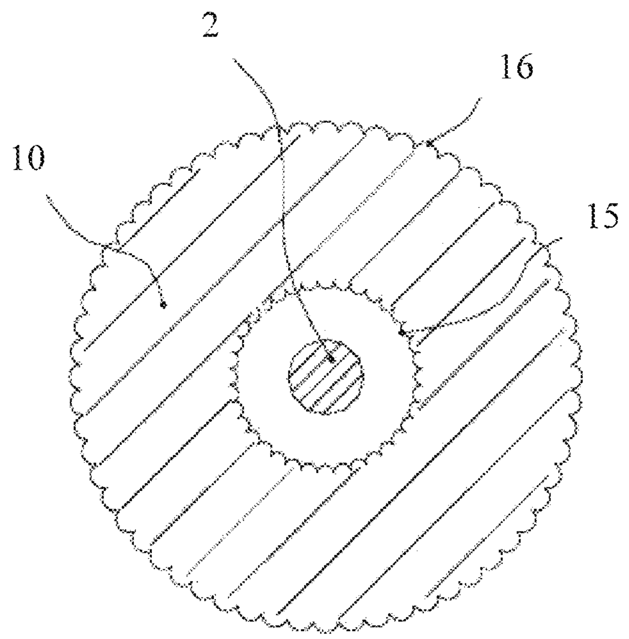
FIG. 8 is a schematic diagram illustrating a cross section of an exemplary light tube according to some embodiments of the present disclosure.
Figure 9:
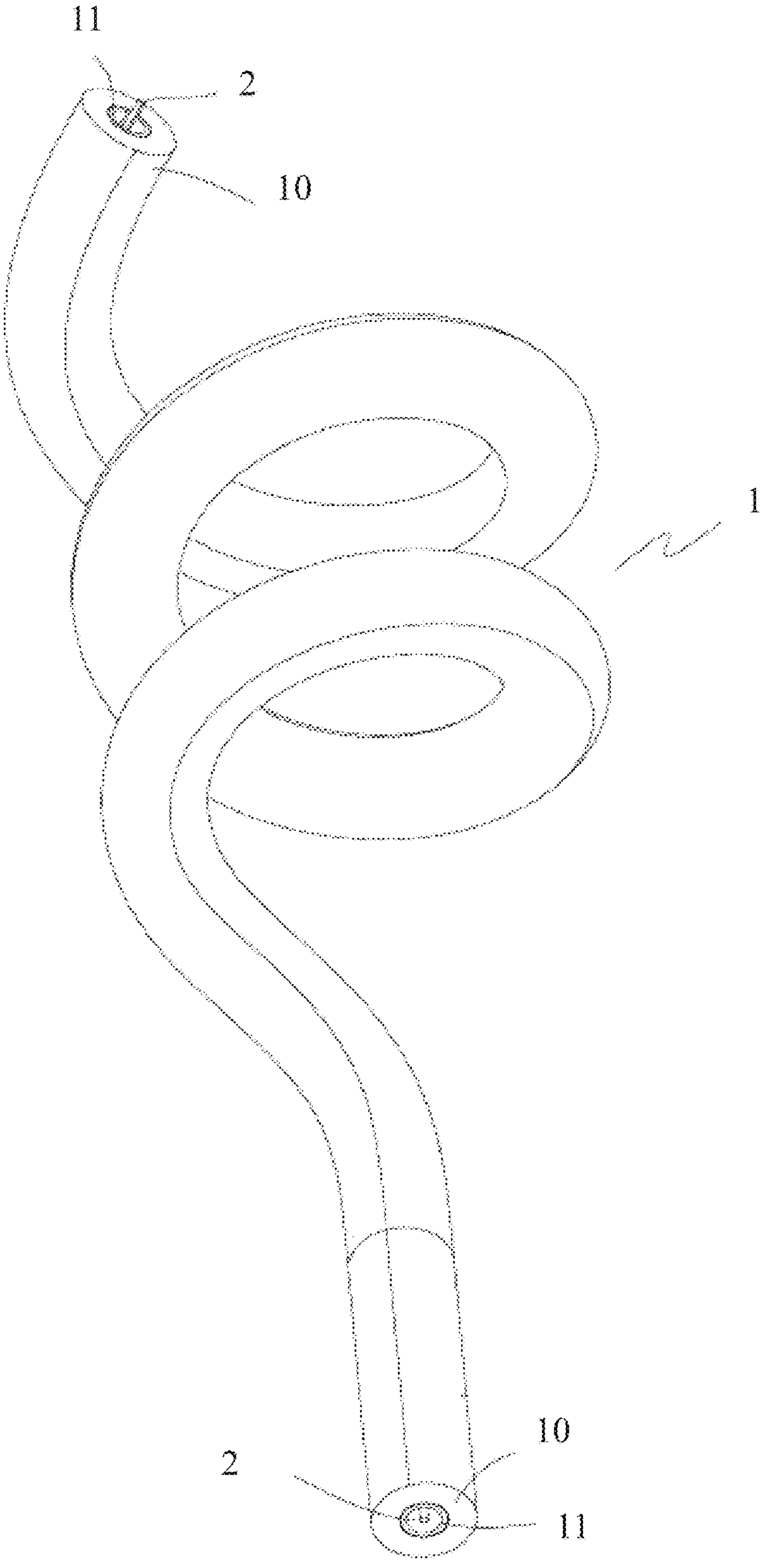
FIG. 9 is a schematic diagram illustrating a three-dimensional structure of the exemplary light tube having the cross section shown in FIG. 2.

FIG. 2 is a schematic diagram illustrating a cross section of an exemplary light tube according to some embodiments of the present disclosure. FIG. 3 is a schematic diagram illustrating a cross section of an exemplary light tube according to some embodiments of the present disclosure. FIG. 4 is a schematic diagram illustrating a cross section of an exemplary light tube according to some embodiments of the present disclosure. FIG. 5 is a schematic diagram illustrating a cross section of an exemplary light tube according to some embodiments of the present disclosure. FIG. 6 is a schematic diagram illustrating a cross section of an exemplary light tube according to some embodiments of the present disclosure. FIG. 7 is a schematic diagram illustrating a cross section of an exemplary light tube according to some embodiments of the present disclosure. FIG. 8 is a schematic diagram illustrating a cross section of an exemplary light tube according to some embodiments of the present disclosure. FIG. 9 is a schematic diagram illustrating a three-dimensional structure of an exemplary light tube having the cross section shown in FIG. 2.

The light-transmitting tube 10 refers to a tubular structural member that allows light to pass through. The light-transmitting tube 10 may include a hollow hole. In some embodiments, the light-transmitting tube 10 may include at least one of a silicone tube, a glass tube, or a plastic tube. The plastic tube may include an acrylic tube, a polycarbonate (PC) tube, or a polyvinyl chloride (PVC) tube, etc. In some embodiments, the light-transmitting tube 10 may be a transparent tube with high light transmittance to show a crystal clear effect and make the light tube more delicate.

In some embodiments, as illustrated in FIG. 4 and FIG. 5, the tube member 1 may include only the light-transmitting tube 10 and may not include the one or more inner layers.

In some embodiments, an outer wall of the light-transmitting tube 10 may be provided with a coated layer 12, an outer refraction layer 16, or an outer diffuse reflection layer 17.

The coated layer 12 refers to a surface structure covering the light-transmitting tube 10. The coated layer 12 may be made of a wear-resistant and corrosion-resistant material, such as an anodized film, a chrome-plated film, etc. For example, as illustrated in FIG. 3, FIG. 4, and FIG. 7, the outer wall of the light-transmitting tube 10 may be provided with the coated layer 12.

The outer refraction layer 16 is a surface structure capable of refracting light outside the light-transmitting tube 10. In some embodiments, the outer refraction layer 16 may include a plurality of second refraction surfaces. The plurality of second refraction surfaces may be distributed on the outer wall of the light-transmitting tube 10. Structures of the second refraction surfaces may be the same as those of first refraction surfaces, as described below for the first refraction surfaces. In some embodiments, as illustrated in FIG. 8, the outer refraction layer 16 may be disposed on the outer wall of the light-transmitting tube 10 and integrated with the light-transmitting tube 10.

The outer diffuse reflection layer 17 is a surface structure capable of performing diffuse reflection on light outside the light-transmitting tube 10. In some embodiments, as illustrated in FIG. 5, the outer diffuse reflection layer 17 may be disposed on the outer wall of the light-transmitting tube 10.

In some embodiments, the outer diffuse reflection layer 17 may include a second coating layer or a second micro-rough layer.

The second coating layer refers to a surface sprayed with a diffuse reflective coating outside the light-transmitting tube 10. Descriptions regarding the diffuse reflective coating may be found in the related descriptions below.

The second micro-rough layer refers to a rough surface disposed outside the light-transmitting tube 10. Formation of the second micro-rough layer may be similar to formation of a first micro-rough layer, which may be found in the related descriptions below.

By setting the coated layer 12 outside the light-transmitting tube 10, the corrosion resistance of the tube member 1 can be improved, and the tube member 1 can be prevented from being corroded by chemical substances, thereby extending the service life of the tube member 1. Meanwhile, the coated layer 12 can increase the abrasion resistance of the tube member 1, and can also make the surface of the tube member 1 more beautiful and flatter, enhancing the visual effect of the tube member 1. The outer diffuse reflection layer 17 realizes uniform diffuse reflection of light through the second coating layer or the second micro-rough layer, thereby reducing glare and avoiding harm to eyes. The outer refraction layer 16 can realize multi-directional refractions through the plurality of second refraction surfaces for multiple times, thereby forming brilliant and colorful light.

In some embodiments, the light tube may further include a heat-absorbing layer.

The heat-absorbing layer refers to a layer structure for absorbing heat. In some embodiments, the heat-absorbing layer may be made of a material with good thermal conductivity, such as an aluminum plate, an aluminum foil, silica gel, or quartz glass, etc.

In some embodiments, the heat-absorbing layer may be disposed on an inner wall of the light-transmitting tube 10.

Heat is released due to illumination performed by the at least one flexible filament 2 when energized. Arranging the heat-absorbing layer on the inner wall of the light-transmitting tube 10 may prevent a light-emitting device from overheating and affecting the service life, and prevent safety problems.

In some embodiments, the light tube may further include a waterproof layer.

The waterproof layer refers to a layer structure that may act as a waterproof layer. In some embodiments, the waterproof layer may be made of a material with good waterproofing performance, such as polyvinyl chloride, a fluorinated polymer, or polycarbonate, etc.

In some embodiments, the waterproof layer may be disposed on the outer wall of the light-transmitting tube 10.

By placing the waterproof layer on the outer wall of the light-transmitting tube 10, the light tube may also be used underwater, extending the application scenarios of the light tube.

The one or more inner layers refer to structural layers disposed in the light-transmitting tube 10. In some embodiments, the one or more inner layers may be disposed on the inner wall of the light-transmitting tube 10 and capable of modifying a light emission effect of the at least one flexible filament 2. Light emitted from the at least one flexible filament 2 may be projected onto the light-transmitting tube 10 through the one or more inner layers and then transmitted outward through the light-transmitting tube 10. In this case, the one or more inner layers may diffusely reflect or homogenize the light passing through the one or more inner layers, making the light emitted from the at least one flexible filament 2 more uniform, enhancing the display effect, reducing glare, and creating a diffuse reflection light source to avoid causing harm to eyes.

In some embodiments, the one or more inner layers may include at least one of the diffusion tube 11, the inner refraction layer 15, or the inner diffuse reflection layer 13. For example, as illustrated in FIG. 2 and FIG. 3, the one or more inner layers may include the diffusion tube 11. As illustrated in FIG. 6 and FIG. 7, the one or more inner layers may include the inner diffuse reflection layer 13. As illustrated in FIG. 8, the one or more inner layers may include the inner refraction layer 15

In some embodiments, the one or more inner layers may include two or more inner layers. For example, the one or more inner layers may include one of the diffusion tube 11, the inner refraction layer 15, or the inner diffuse reflection layer 13, or any combination thereof.

The diffusion tube 11 refers to a tubular structural member that scatters light. A material of the diffusion tube 11 has certain transparency and scattering performance, so that the light passing through the diffusion tube 11 is softer and more uniform. In some embodiments, as illustrated in FIG. 2 and FIG. 3, the one or more inner layers may be the diffusion tube 11, and the tube member 1 may include the light-transmitting tube 10 and the diffusion tube 11. For example, as illustrated in FIG. 2, the diffusion tube 11 may be disposed on the inner wall of the light-transmitting tube 10.

In some embodiments, the diffusion tube 11 may be sleeved within the light-transmitting tube 10. For example, as illustrated in FIG. 2 and FIG. 9, the diffusion tube 11 may be sleeved within the light-transmitting tube 10 to form the tube member 1.

In some embodiments, the diffusion tube 11 may include at least one of a colored plastic tube, a fluorescent plastic tube, a frosted plastic tube, or a heat-shrinkable sleeve. The heat-shrinkable sleeve may be a colored heat-shrinkable plastic tube with light transmittance and diffuse reflection performance.

The light-transmitting tube 10 and the diffusion tube 11 may be made of different materials, so that the light tube can present different lighting effects through combination of different materials, thereby realizing the lighting needs for multiple scenarios.

In some embodiments, the inner wall of the light-transmitting tube 10 may be a non-smooth surface. In some embodiments, the outer wall of the diffusion tube 11 may be a non-smooth surface. In some embodiments, both the inner wall of the light-transmitting tube 10 and the outer wall of the diffusion tube 11 may be non-smooth surfaces.

When the diffusion tube 11 penetrates into the light-transmitting tube 10, the outer wall of the diffusion tube 11 may contact with the inner wall of the light-transmitting tube 10. A contact surface may be a non-smooth surface, which may not cause extrusion to form a contact surface as an indentation.

In some embodiments, a wall thickness of the light-transmitting tube 10 may be within a range of 5 mm-20 mm. A hole diameter of the light-transmitting tube 10 may be within a range of 3 mm-10 mm. A wall thickness of the diffusion tube 11 may be within a range of 0.1 mm-3 mm. For example, the wall thickness of the light-transmitting tube 10 may be within a range of 6 mm-8 mm. The hole diameter of the light-transmitting tube 10 may be within a range of 4 mm-6 mm. The wall thickness of the diffusion tube 11 may be within a range of 0.1 mm-1.2 mm. As another example, the wall thickness of the light-transmitting tube 10 may be within a range of 18 mm-20 mm. The hole diameter of the light-transmitting tube 10 may be within a range of 8 mm-10 mm. The wall thickness of the diffusion tube 11 may be within a range of 2.4 mm-3 mm. In some embodiments, the wall thickness of the light-transmitting tube 10, the hole diameter of the light-transmitting tube 10, and the wall thickness of the diffusion tube 11 may also be set to other combinations of ranges, which may be determined based on actual needs.

The hole diameter of the light-transmitting tube 10 refers to a diameter of the inner wall of the light-transmitting tube 10, i.e., a diameter of a hollow hole in the light-transmitting tube 10. It should be understood that the hole diameter of the light-transmitting tube 10 may be greater than an outer diameter of the diffusion tube 11, thereby ensuring that the diffusion tube 11 may be disposed in the hollow hole in an inner side of the light-transmitting tube 10. The outer diameter of the diffusion tube 11 refers to a diameter of the outer wall of the diffusion tube 11.

In some embodiments, the wall thickness of the light-transmitting tube 10 may be greater than or equal to ⅕ of the outer diameter of the light-transmitting tube 10. The outer pipe diameter of the light-transmitting tube 10 refers to a diameter of the outer wall of the light-transmitting tube 10. In some embodiments, the outer diameter of the light-transmitting tube 10 may be determined to be within a range of 13 mm-50 mm based on the wall thickness and the hole diameter of the light-transmitting tube 10. For example, if the outer diameter of the light-transmitting tube 10 is 40 mm, the wall thickness of the light-transmitting tube 10 may be greater than or equal to 8 mm. The above mode of setting the wall thickness of the light-transmitting tube 10 ensures the wall thickness of the light-transmitting tube 10 and reflects the three-dimensional effect between the light-transmitting tube 10 and the diffusion tube 11. In addition, since the wall thickness of the light-transmitting tube 10 is relatively large, the light tube may be more stable and durable.

For example, when the light-transmitting tube 10 is a PC tube and the diffusion tube 11 is a milky-white acrylic tube, the outer diameter of the PC tube may be within a range of 15 mm-25 mm, and the hole diameter of the PC tube may be within a range of 8 mm-10 mm. The outer diameter of the milky-white acrylic tube may be within a range of 6 mm-10 mm, and the hole diameter of the milky-white acrylic tube may be within a range of 4 mm-8 mm.

In some embodiments, as illustrated in FIG. 2, a thickness of a gap 20 between the outer wall of the diffusion tube 11 and the inner wall of the light-transmitting tube 10 may be within a range of 0.1 mm-10 mm. The thickness of the gap refers to an average thickness of the gap. By arranging a certain thickness of gap between the outer wall of the diffusion tube 11 and the inner wall of the light-transmitting tube 10, it may be easier for the diffusion tube 11 to penetrate into the light-transmitting tube 10.

In some embodiments, the hole diameter of the diffusion tube 11 may be greater than a diameter of the at least one flexible filament 2, thereby ensuring penetration of the at least one flexible filament 2. For example, the hole diameter of the diffusion tube 11 may be at least 2 mm greater than the diameter of the at least one flexible filament 2. In some embodiments, the diameter of the at least one flexible filament 2 may be within a range of 1.5 mm-3 mm.

The inner refraction layer 15 refers to a surface structure capable of refracting light inside the light-transmitting tube 10.

The inner diffuse reflection layer 13 refers to a surface structure capable of diffusing light inside the light-transmitting tube 10

In some embodiments, the inner diffuse reflection layer 13 may include a first coating layer or a first micro-rough layer.

The first coating layer refers to a surface sprayed with a diffuse reflection coating inside the light-transmitting tube 10. The diffuse reflection coating refers to a coating capable of scattering light uniformly, such as a white diffuse reflection coating, a diffuse reflection coating for metal particles, etc.

The first micro-rough layer refers to a rough surface disposed in the light-transmitting tube 10. The first micro-rough layer may be formed by a surface roughening treatment. The surface roughening treatment may include a surface treatment by a mechanical technology or a chemical technology for achieving a micro-rough surface structure through mechanical abrasion or chemical etching.

In some embodiments, the inner diffuse reflection layer 13 may be disposed on the inner wall of the light-transmitting tube 10, or on the inner and/or the outer wall of the diffusion tube 11. For example, as illustrated in FIG. 6, when the one or more inner layers include only the inner diffuse reflection layer 13, a diffuse reflection effect may be achieved either by spraying the diffuse reflection coating on the inner wall of the light-transmitting tube 10 or performing the surface roughening treatment on the inner wall of the light-transmitting tube 10.

In some embodiments, the inner refraction layer 15 may include a plurality of first refraction surfaces. The plurality of first refraction surfaces may be distributed on the inner wall of the light-transmitting tube 10. The plurality of first refraction surfaces may include at least one of a refraction plane, a spherical plane, or a curved plane. In some embodiments, the inner refraction layer 15 may be disposed on the inner wall of the light-transmitting tube 10 and integrated with the light-transmitting tube 10. In some embodiments, the plurality of first refraction surfaces may be distributed circumferentially and capable of refracting light emitted from the at least one flexible filament 2 in different directions for multiple times.

The inner diffuse reflection layer 13 achieves uniform diffuse reflection of the light through the first coating layer or the first micro-rough layer, so as to reduce glare and avoid causing harm to the eyes. The inner refraction layer 15 may achieve multi-directional refractions through the plurality of first refraction surfaces, thereby forming the brilliant and colorful light.

The at least one flexible filament 2 refers to an elongated and flexible structural member. A material of the at least one flexible filament 2 may be a metal or an alloy. After the light tube is energized, the at least one flexible filament 2 may emit light. In some embodiments, one or more flexible filaments 2 may be provided. The one or more flexible filaments 2 may penetrate into the one or more inner layers. The one or more flexible filaments 2 may be juxtaposed or spliced to form a longer flexible filament 2 penetrating into the one or more inner layers.

During mounting, the at least one flexible filament 2 may penetrate into the one or more inner layers with an auxiliary means. The auxiliary means may include guiding the at least one flexible filament 2 through a guide tube, making the at least one flexible filament 2 penetrate into the one or more inner layers with a fixture or a clamp, etc.

Figure 10:
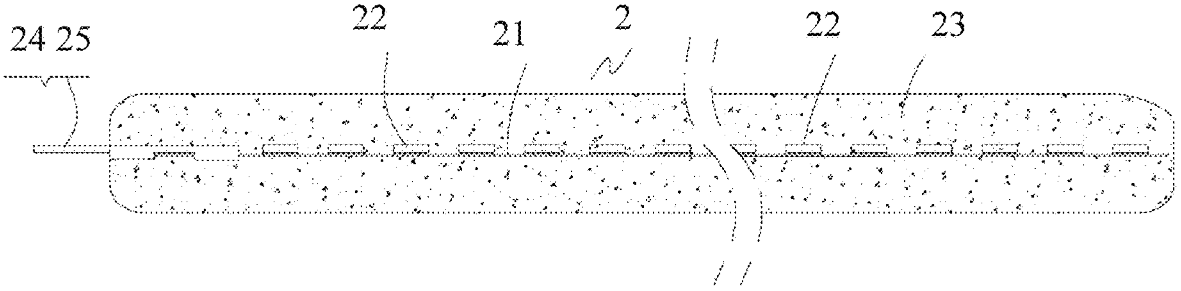
FIG. 10 is a front view illustrating an exemplary flexible filament of which a single side is provided with a conductive contact according to some embodiments of the present disclosure.
Figure 11:
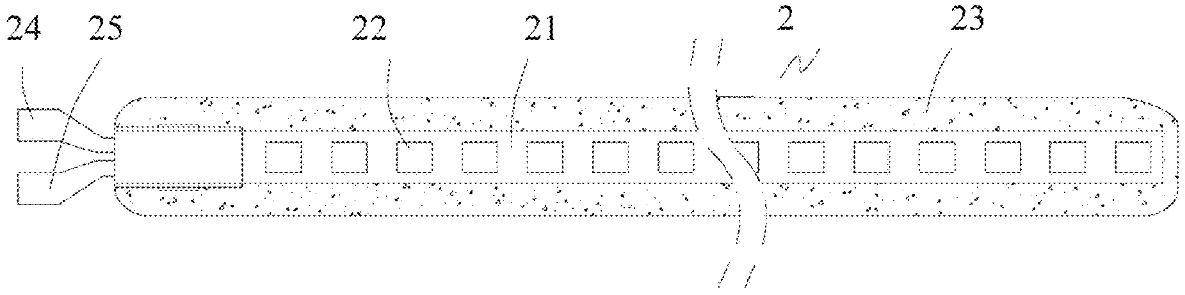
FIG. 11 is a top view illustrating an exemplary flexible filament of which a single side is provided with a conductive contact according to some embodiments of the present disclosure.
Figure 12:
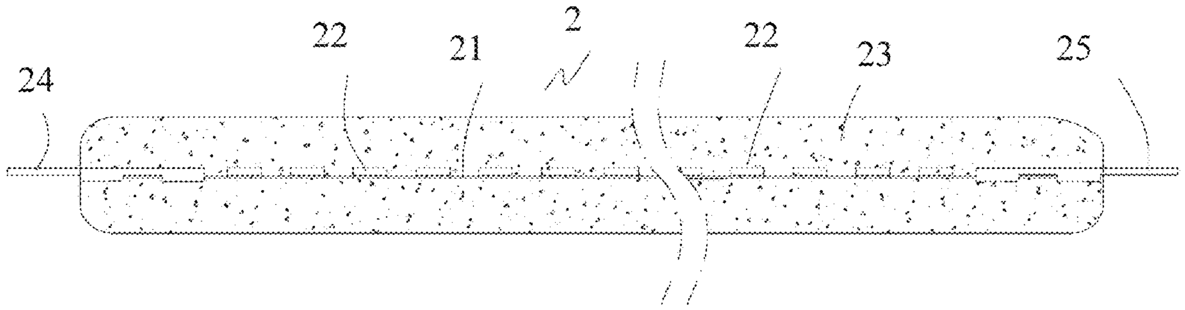
FIG. 12 is a front view illustrating an exemplary flexible filament of which two ends are provided with conductive contacts, respectively, according to some embodiments of the present disclosure.
Figure 13:
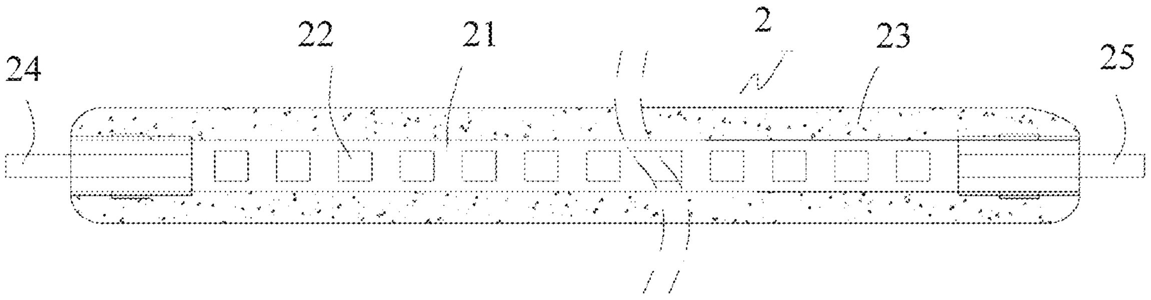
FIG. 13 is a top view illustrating an exemplary flexible filament of which two ends are provided with conductive contacts, respectively, according to some embodiments of the present disclosure.

FIG. 10 is a front view illustrating an exemplary flexible filament of which a single side is provided with a conductive contact according to some embodiments of the present disclosure. FIG. 11 is a top view illustrating an exemplary flexible filament of which a single side is provided with a conductive contact according to some embodiments of the present disclosure. FIG. 12 is a front view illustrating an exemplary flexible filament of which two ends are provided with conductive contacts, respectively, according to some embodiments of the present disclosure. FIG. 13 is a top view illustrating an exemplary flexible filament of which two ends are provided with conductive contacts, respectively, according to some embodiments of the present disclosure.

In some embodiments, the at least one flexible filament 2 may include a first conductive contact 24, a second conductive contact 25, a flexible substrate 21, and a plurality of LED chips 22.

The flexible substrate 21 refers to a basic structural member penetrating through the at least one flexible filament 2. In some embodiments, the flexible substrate 21 may be externally coated with a fluorescent adhesive layer 23 to form a filament body.

The first conductive contact 24 and the second conductive contact 25 are structural members on the at least one flexible filament 2 for conducting electricity.

In some embodiments, the first conductive contact 24 and the second conductive contact 25 may be disposed at one end of the filament body or at two ends of the filament body, respectively. For example, as illustrated in FIGS. 10-11, the first conductive contact 24 and the second conductive contact 25 may be disposed at one end of the filament body. For example, as illustrated in FIGS. 12-13, the first conductive contact 24 and the second conductive contact 25 may be disposed at the two ends of the filament body, respectively. When a light tube includes a plurality of flexible filaments 2, the first conductive contacts 24 and/or the second conductive contacts 25 disposed at the ends of the filament bodies of the plurality of flexible filaments 2 may be cut and spliced together to form a longer flexible filament.

The plurality of LED chips 22 are light-emitting components of the filament. In some embodiments, the plurality of LED chips 22 may be distributed and connected in series and/or parallel on the flexible substrate 21. The plurality of LED chips 22 may be distributed on a front side and/or a back side of the flexible substrate 21. For example, the plurality of LED chips 22 may be simultaneously distributed on both the front side and the back side of the flexible substrate 21. When being energized, both the front side and the back side of the flexible substrate 21 may emit light simultaneously, eliminating any blind space in the light source, and providing a better effect for the at least one flexible filament 2.

In some embodiments, the plurality of LED chips 22 may be connected to a power supply through the first conductive contact 24 and the second conductive contact 25 to form a circuit.

The embodiments of the present disclosure have at least the following beneficial effects: (1) arranging the one or more inner layers such as the diffusion tube, the inner refraction layer, or the inner diffuse reflection layer in the light-transmitting tube can produce different lighting effects, while realizing diffuse reflection of the light to reduce glare and avoid harm to the eyes; (2) the tube member can be of the regular or irregular shape, meeting the styling needs of the light tube; (3) arranging the flexible filament in the tube member provides a special visual effect with clear hierarchy and a strong three-dimensional sense, which can be used as decorations during the day and for illumination at night, thereby achieving different atmospheric effects.

It should be noted that the above description of the light tube and constituent parts thereof is for convenience of description only, and does not limit the present disclosure to the scope of the cited embodiments. It should be understood that for a person skilled in the art, after understanding the principle of the device, it is possible to make any combination of the constituent parts of the light tube without departing from this principle.

Figure 14:
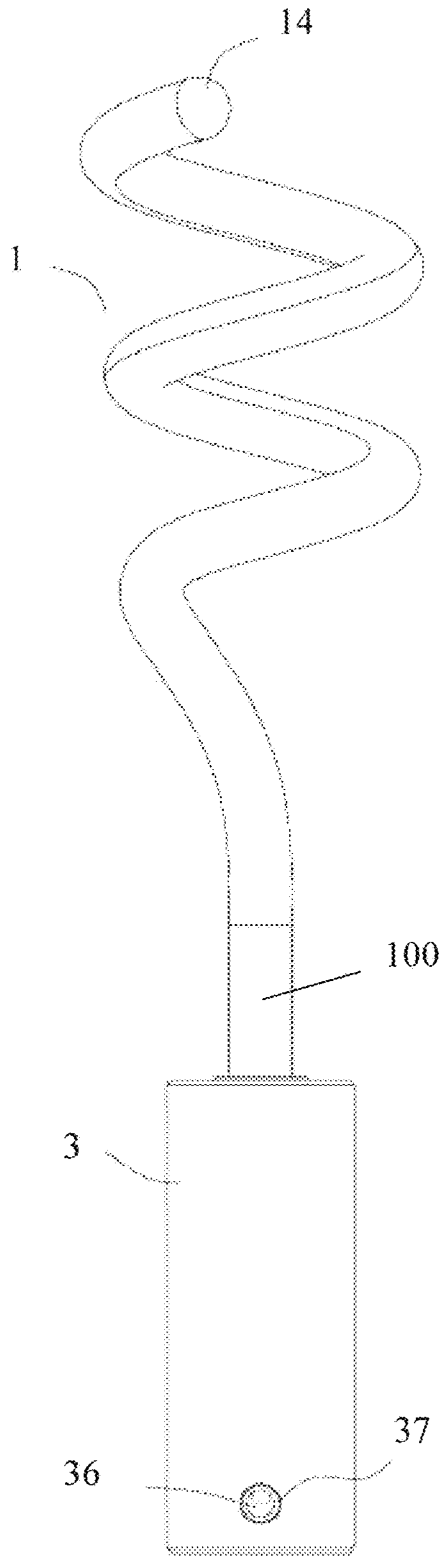
FIG. 14 is a schematic diagram illustrating a front view of an exemplary light fixture comprising a light tube and a light holder according to some embodiments of the present disclosure.
Figure 15:
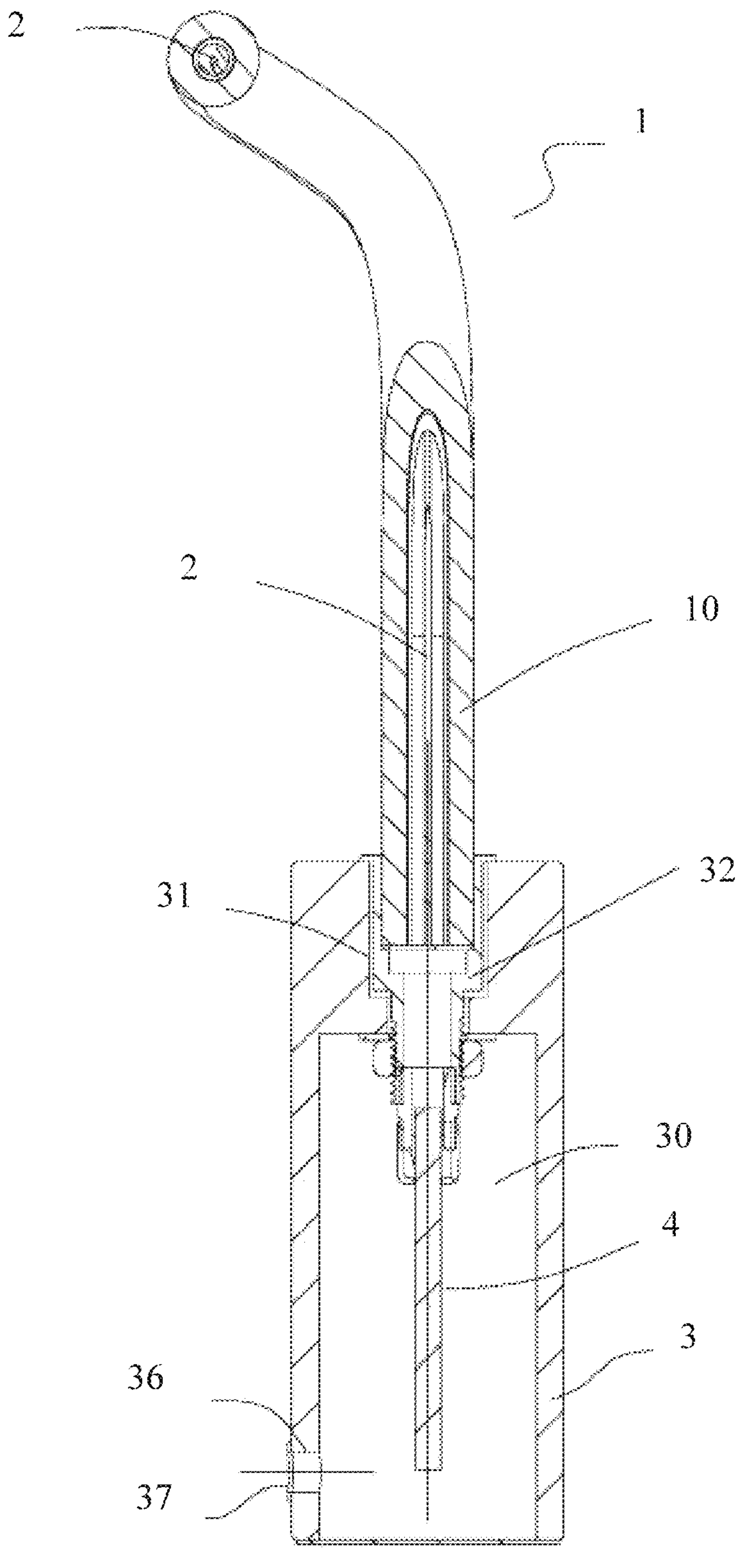
FIG. 15 is a cross-sectional view illustrating an exemplary light fixture comprising a light tube and a light holder according to some embodiments of the present disclosure.
Figure 16:
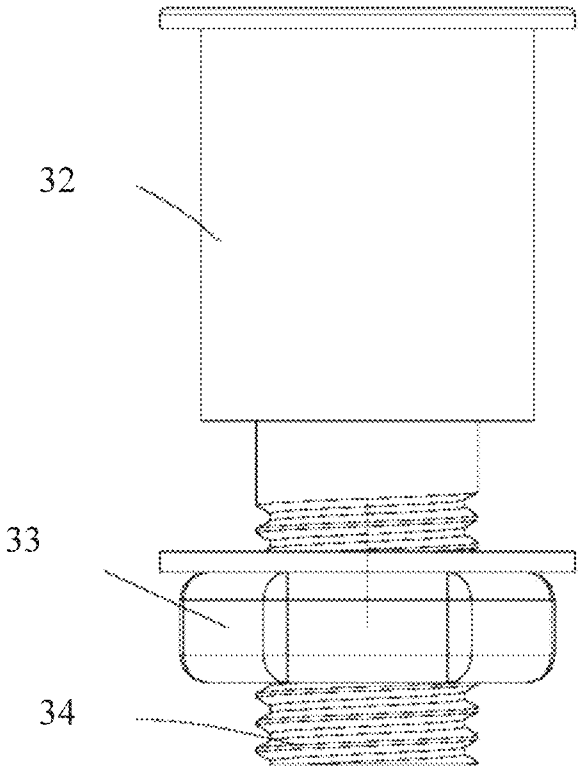
FIG. 16 is a schematic diagram illustrating an exemplary connection of a connecting sleeve and a nut according to some embodiments of the present disclosure.
Figure 17:
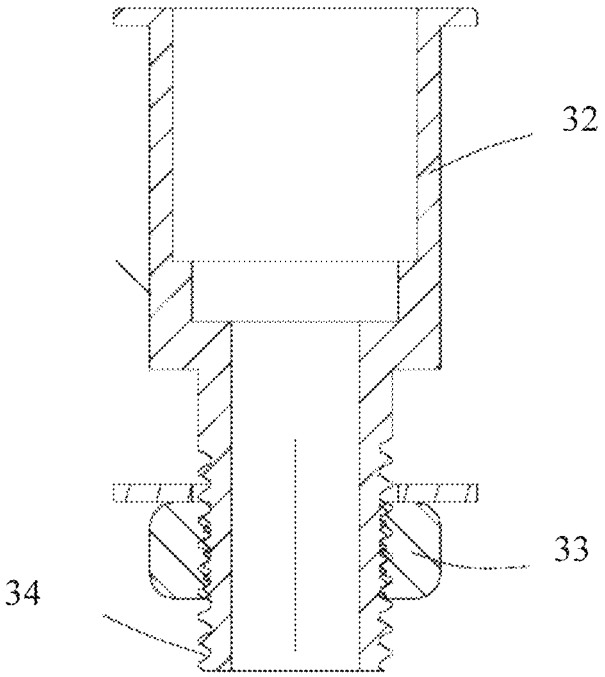
FIG. 17 is a cross-sectional view illustrating an exemplary connection of a tube member and a light holder according to some embodiments of the present disclosure.
Figure 18:
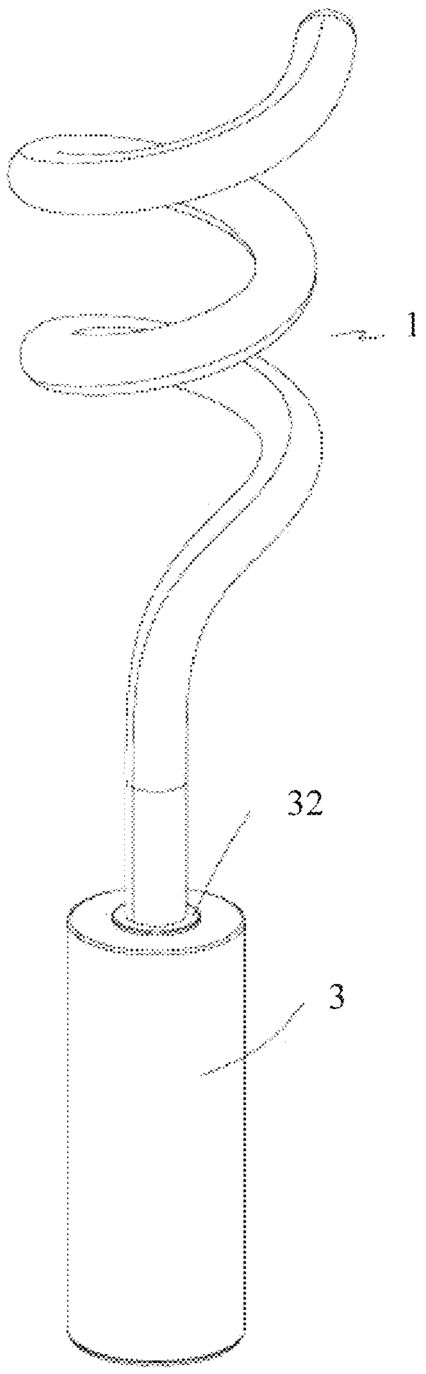
FIG. 18 is a schematic diagram illustrating a three-dimensional structure of an exemplary light fixture according to some embodiments of the present disclosure.

FIG. 14 is a schematic diagram illustrating a front view of an exemplary light fixture comprising a light tube and a light holder according to some embodiments of the present disclosure. FIG. 15 is a cross-sectional view illustrating an exemplary light fixture comprising a light tube and a light holder according to some embodiments of the present disclosure. FIG. 16 is a schematic diagram illustrating an exemplary connection of a connecting sleeve and a nut according to some embodiments of the present disclosure. FIG. 17 is a cross-sectional view illustrating an exemplary connection of a tube member and a light holder according to some embodiments of the present disclosure. FIG. 18 is a schematic diagram illustrating a three-dimensional structure of an exemplary light fixture according to some embodiments of the present disclosure.

Some embodiments of the present disclosure provide a light fixture. In some embodiments, as illustrated in FIG. 14 and FIG. 15, the light fixture may include a light holder 3 and a light tube. The light tube may include at least one flexible filament 2 and at least one tube member 1. The at least one tube member 1 may include a sealed end and a connecting end 100. The sealed end may be connected with a plug 14. The at least one tube member 1 may be mounted on the light holder 3 through the connecting end 100.

More descriptions regarding the light tube, the at least one flexible filament 2, and the tube member 1 may be found in FIGS. 1-13 and related descriptions thereof.

The sealed end refers to an end of the tube member 1 for scaling. In some embodiments, the sealed end may be connected to the plug 14 to seal the tube member 1. A material of the plug 14 may include plastic, metal, or rubber, etc. The plastic plug is lightweight and not easy to rust. The metal plug has high corrosion and pressure resistance and is suitable for high-temperature and high-pressure environments. The rubber plug has good scaling performance and abrasion resistance and is suitable for occasions with high sealing requirements.

The connecting end 100 refers to an end of the tube member 1 connected with the light holder 3. The connecting end 100 may be unsealed so as to be electrically connected with the light holder 3. In some embodiments, as illustrated in FIG. 14, the sealed end and the connecting end 100 may be disposed at two ends of the tube member 1, respectively.

The light holder 3 refers to a base 9 configured to mount the light tube of the light fixture. In some embodiments, a material of the light holder 3 may include a man-made material or a natural stone, a metal material or a glass material, etc. In some embodiments, the light holder 3 may be provided in a column, rectangle, or other shapes. The light holder 3 ensures the stability of the light fixture and improves the aesthetics of the light fixture.

In some embodiments, a mounting cavity 30 may be disposed in the light holder 3. An upper end of the mounting cavity 30 may be provided with at least one stepped through hole 31. The at least one stepped through hole 31 may be communicated with the mounting cavity 30. The connecting end 100 of the at least one tube member 1 may be fixedly connected with the stepped through hole 31 through a connecting sleeve 32.

The mounting cavity 30 refers to a cavity structure for mounting the light tube inside the light holder 3.

The stepped through hole 31 refers to a stepped hole structure disposed at the upper end of the mounting cavity 30. The connecting sleeve 32 refers to a cylinder structure for fixing the connecting end 100. In some embodiments, a shape of an inner wall of the connecting sleeve 32 may match the connecting end 100, and a shape of an outer wall of the connecting sleeve 32 may match the stepped through hole 31. As illustrated in FIG. 18, the connecting end 100 of the at least one tube member 1 may be fixed on the light holder 3 through the connecting sleeve 32.

The mounting cavity 30 and the stepped through hole 31 may allow the at least one tube member 1 to be better fixed in the light holder 3.

In some embodiments, the connecting sleeve 32 may be a stepped sleeve. A hole diameter of an axial upper end of the connecting sleeve 32 may match a diameter of the connecting end 100 of the at least one tube member 1, and an axial lower end of the connecting sleeve 32 may extend into the mounting cavity 30 through the stepped through hole 31. The hole diameter of the axial upper end of the connecting sleeve 32 may be greater than a hole diameter of the axial lower end of the connecting sleeve 32, and the hole diameter of the axial upper end of the connecting sleeve 32 may be a largest diameter of the connecting sleeve 32. An axial direction refers to a direction of a central axis of the connecting sleeve 32 in a radial direction.

In some embodiments, the connecting sleeve 32 may be fixedly connected with the stepped through hole 31 to fixedly mount the light tube on the light holder 3. The connecting sleeve 32 and the stepped through hole 31 may be fixedly connected in various ways. For example, as illustrated in FIGS. 16-17, threads 34 may be radially disposed at a lower end of the connecting sleeve 32. The connecting sleeve 32 may be fixedly connected with the stepped through hole 31 by screwing a nut 33 onto the threads 34.

In some embodiments, the at least one flexible filament 2 may penetrate through the connecting sleeve 32 and the light holder 3 via a cable 4 to be electrically connected with a power cord outside the light holder 3.

The above setting of the connecting sleeve 32 may allow an upper end of the connecting sleeve 32 to fit a shape of a lower end of the tube member 1, thereby realizing a tighter connection between the tube member 1 and the light holder 3.

In some embodiments, the light holder 3 may be provided with a threading hole 36 communicated with the mounting cavity 30. A rubber sleeve 37 may be connected in the threading hole 36. The at least one flexible filament 2 may penetrate through the rubber sleeve 37 via the cable 4 to be electrically connected with the power cord outside the light holder 3.

In some embodiments, the threading hole 36 may be disposed on two sides or at a bottom of the light holder 3. A specific position of the threading hole 36 may be determined based on a use scenario of the light fixture. For example, as illustrated in FIGS. 14-15, the threading hole 36 may be disposed on a side of the light holder 3 when the light fixture is used as a table light. As another example, the threading hole 36 may be disposed at the bottom of the light holder 3 when the light fixture is used as the table light.

In some embodiments, the rubber sleeve 37 may be made of a material such as rubber. A middle of the rubber sleeve 37 may be provided with a hole. In some embodiments, the at least one flexible filament 2 may penetrate through the rubber sleeve 37 inside the threading hole 36 via the cable 4 electrically connected with the at least one flexible filament 2 to be electrically connected with the power cord outside the light holder 3.

The threading hole may be disposed on the light holder to facilitate the flexible filament to connect to the power supply. The rubber sleeve may form a protection for the cable 4 to reduce the wear and tear caused by friction on the cable 4, thereby improving the service life of the light fixture.

In some embodiments of the present disclosure, by mounting the light tube on the light holder of different shapes through the sealed end of the tube member, the use requirements of different scenarios can be realized, such as a floor light fixture, a wall light fixture, a table light fixture, etc.

In some embodiments, the light fixture may further include at least one temperature detection element, a communication component, a control component, and at least one power-off device.

The at least one temperature detection element refers to an element for detecting temperature, such as a temperature sensor, etc. The at least one temperature detection element may be configured to detect the temperature of at least one position on the light fixture. In some embodiments, the at least one temperature detection element may be disposed on the light fixture. For example, the at least one temperature detection element may be disposed on or near a power supply of the light fixture. The power supply of the light fixture may include an external power supply, a battery, etc. In some embodiments, the at least one temperature detection element may be connected with the power-off device.

The power-off device refers to a device configured to disconnect a circuit. The power-off device may be set to various circuit breakers, such as an air switch. In some embodiments, the power-off device may be connected with the power supply such as the battery or the external power supply, thereby disconnecting the power supply such as the battery or the external power supply.

The communication component refers to a component for transmitting or receiving information. For example, the communication component may include at least one of a wireless module, a network card module, and a Bluetooth module. In some embodiments, the at least one temperature detection element, the power-off device, and the control component may be in communicating connection based on the communication component.

The control component refers to a component configured to process data related to the light fixture. The control component may be configured as an embedded microprocessor or a simple logic controller, etc.

In some embodiments, the at least one temperature detection element may be distributed at different positions on the light fixture. The distribution positions of the at least one temperature detection element may be related to shape features of the light fixture, wiring features the light fixture, etc.

The shape features of the light fixture are features related to a shape of the light fixture, such as the shape of the light fixture, a size of the light fixture, etc. The shape features of a specific light fixture may be determined, which may be pre-input into the control component.

The wiring features are features related to cable arrangement of the light fixture, such as cable routing, etc. The wiring features of the specific light fixture may be determined, which may be pre-input into the control component.

In some embodiments, the control component may determine nodes based on the shape features and the wiring features of the light fixture, and determine the nodes as distribution positions of the at least one temperature detection element. In some embodiments, the shape features and the wiring features of the light fixture and the nodes may have a correspondence relationship, which may be manually preset. The nodes may include junctions of the cable and turning points of the shape of the light fixture. The junctions of the cable refer to junctions of electrical connections between different structures of the light fixture, e.g., junctions of series and/or parallel connections of the plurality of LED chips 22, junctions of lights and a switch 92, etc. The turning points of the shape of the light fixture refer to a collection of turning points of the light fixture. For example, turning points of a triangular light fixture may be vertices of a triangle, and turning points of a wavy light fixture may be inflection points of waves.

In some embodiments, the shape features of the light fixture may further include a radian distribution feature of the filament.

The radian distribution feature of the filament refers to a feature related to filament bending. For example, if the filament is bent along a filament path, a radian distribution at a bent position of the filament may be the radian distribution feature of the filament.

In some embodiments, the radian distribution feature may be obtained by calculating a curvature. For example, the curvature of each bent position of the filament may be calculated, and the obtained curvature of one or more bent positions may be used as the radian distribution feature.

In some embodiments, the at least one temperature detection element may be distributed at the bent positions of the filament. A distribution count of the at least one temperature detection element at each bent position may be determined based on the curvature. In some embodiments, the distribution count of the at least one temperature detection element may be positively related to the curvature. For example, the distribution count may be obtained based on an equation (1) presented below:

$$\text{Distribution count} = \text{curvature} \times k, \quad (1)$$

wherein k denotes a parameter greater than 1. It should be understood that the greater the curvature, the greater the bending amplitude, and the greater the distribution count of the temperature detection element; and the smaller the curvature, the smaller the bending amplitude, and the smaller the distribution count of the at least one temperature detection element.

A position of a high bending amplitude tends to gather heat and is more prone to failure. The distribution count of the at least one temperature detection element may be determined through the radian distribution feature of the filament, so that more temperature detection elements may be disposed at the positions with the high bending amplitude, which makes it easy to detect the failure in time.

In some embodiments, the control component may be configured to acquire a temperature distribution from the at least one temperature detection element based on an acquisition cycle; and in response to determining of the temperature distribution, determine a faulty power supply based on the temperature distribution, and control the corresponding power-off device to perform a power-off operation.

The temperature distribution refers to a distribution of a temperature of the light fixture. In some embodiments, the temperature distribution may include temperature monitoring points. The temperature monitoring points refer to detection positions of the at least one temperature detection element. The temperature distribution may include at least one temperature monitoring point and a monitoring temperature corresponding to the at least one temperature monitoring point.

The acquisition cycle refers to an interval at which the control component acquires the temperature distribution, such as once every 5 min, once every 10 min, etc. In some embodiments, the acquisition cycle may be determined in various ways. For example, the acquisition cycle may be set manually on demand.

In some embodiments, the light fixture may further include a remote server. The remote server may be configured to process information related to the light fixture. The information related to the light fixture may include light fixture usage time, the acquisition cycle of the control component for obtaining the temperature distribution, etc. In some embodiments, the remote server may be in communicating connection with the control component through the communication component.

In some embodiments, the remote server may be configured to determine the acquisition cycle based on the light fixture usage time, and send the acquisition cycle to the control component through the communication component.

The light fixture usage time refers to a usage duration of the light fixture. The light fixture usage time may be obtained in various ways. For example, a timer may be arranged on the control component, and the light fixture usage time may be obtained through the timer arranged on the control component.

In some embodiments, the acquisition cycle may be positively related to the light fixture usage time. For example, the acquisition cycle may be calculated based on an equation (2) presented below:

$$\text{Acquisition cycle} = \text{the light fixture usage time} \times b + \text{basic cycle} \quad (2),$$

wherein b denotes a coefficient greater than 1, which may be preset.

By arranging the remote server and determining the acquisition cycle based on the light fixture usage time, the acquisition cycle may be more in line with an actual usage of the light fixture, helping to troubleshoot the faulty power supply in time.

Due to the design requirements of the light fixture, the control component arranged in the light fixture may be small and computational power may be insufficient. Arranging the remote server may process a large amount of information related to the light fixture, thus making the calculated acquisition cycle of the control component more accurate and in line with the actual situation.

In some embodiments, in response to determining of the temperature distribution, the control component may query a power supply corresponding to the temperature distribution in a preset table based on the temperature distribution, and determine the power supply as the faulty power supply. The preset table may include a mapping relationship between the temperature distribution and the power supply. The preset table may be determined during processing of the light fixture. For example, a temperature monitoring point on a cable connected with an external power supply may correspond to the external power supply, and a temperature monitoring point on the cable connected with a storage battery may correspond to the storage battery. It should be understood that two or more power supplies may share a same circuit, and thus one temperature monitoring point may correspond to two or more power supplies.

In some embodiments, the light fixture may further include a fault indication component. The fault indication component refers to a component for issuing a fault indication. For example, the fault indication component may be a faulty light or a user APP, etc.

In some embodiments, the control component may be further configured to control the fault indication component to perform fault indication based on the faulty power supply.

For example, when the fault indication component is the faulty light, the control component may control the faulty light to turn on. As another example, when the fault indication component is the user APP, the control component may send fault information to the user APP for display.

The fault can be responded in time by repairing or replacing the faulty power supply through the fault indication component.

The light fixture may be connected with the external power supply or the storage battery, and high voltage or current of the power supply may easily cause circuit safety issues. By arranging the distributed temperature detection elements, the communication component, the control component, and the at least one power-off device, the power supply with a circuit problem can be determined and responded by performing the power-off operation, thereby avoiding the safety issues and protecting the light fixture. When one power supply fails, the other power supply may work normally, thereby improving the stability of the light fixture. For example, when the storage battery fails and is powered off, the light fixture may operate normally with the external power supply.

Figure 19:
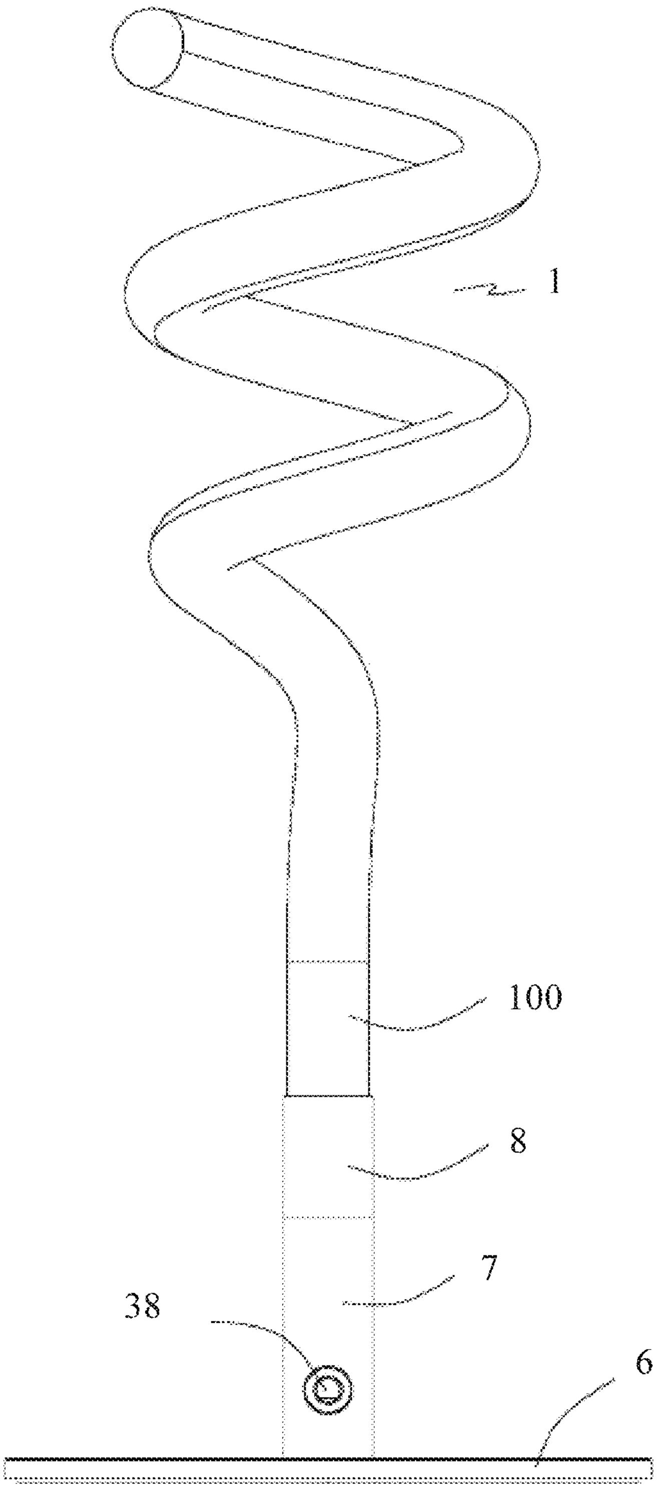
FIG. 19 is a front view illustrating an exemplary light fixture comprising a light tube and a chassis according to some embodiments of the present disclosure.
Figure 20:
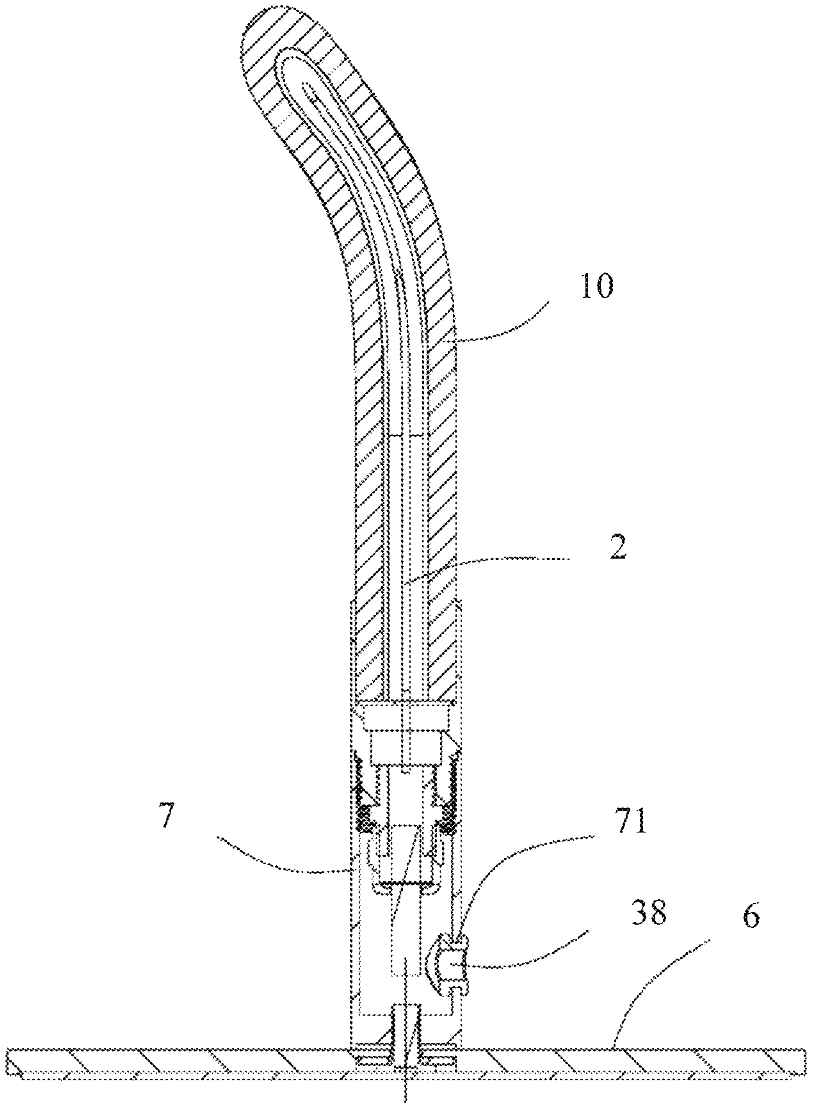
FIG. 20 is a cross-sectional view illustrating an exemplary light fixture comprising a light tube and a chassis according to some embodiments of the present disclosure.
Figure 21:
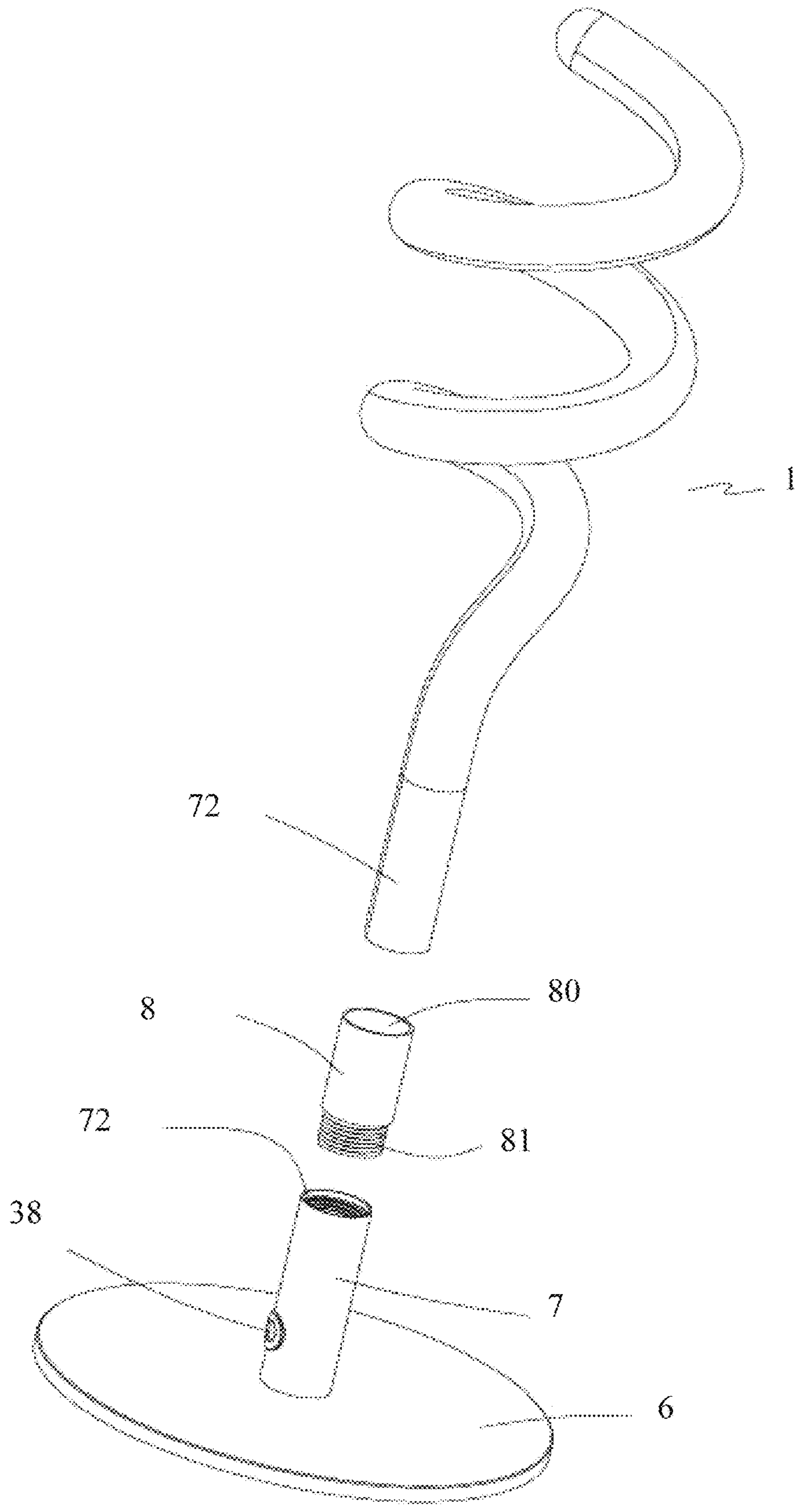
FIG. 21 is a decomposition diagram illustrating an exemplary light fixture comprising a light tube and a chassis according to some embodiments of the present disclosure.
Figure 22:
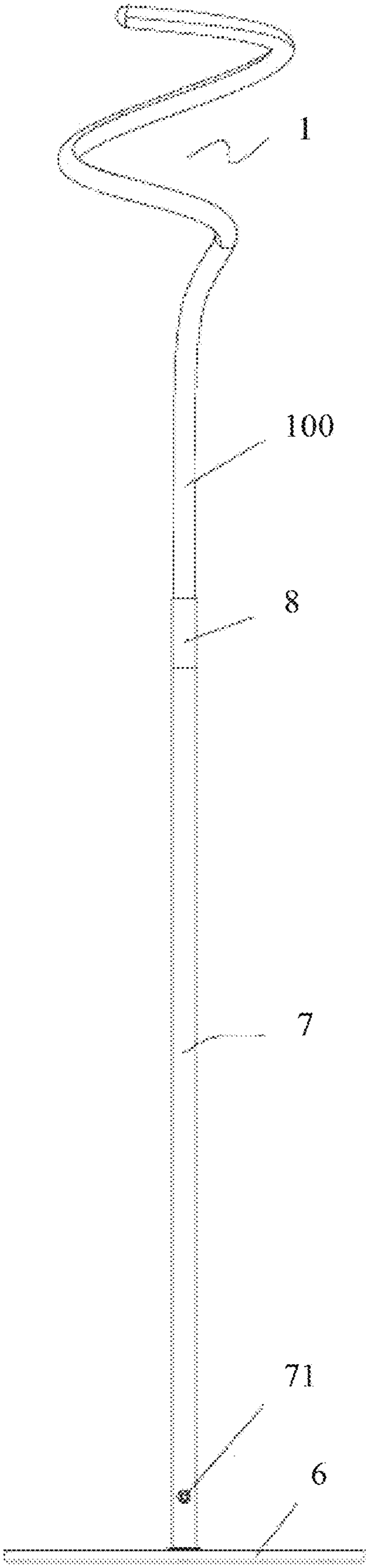
FIG. 22 is a schematic diagram illustrating a front view of an exemplary light fixture comprising a light tube, a mounting sleeve, and a chassis according to some embodiments of the present disclosure.
Figure 23:
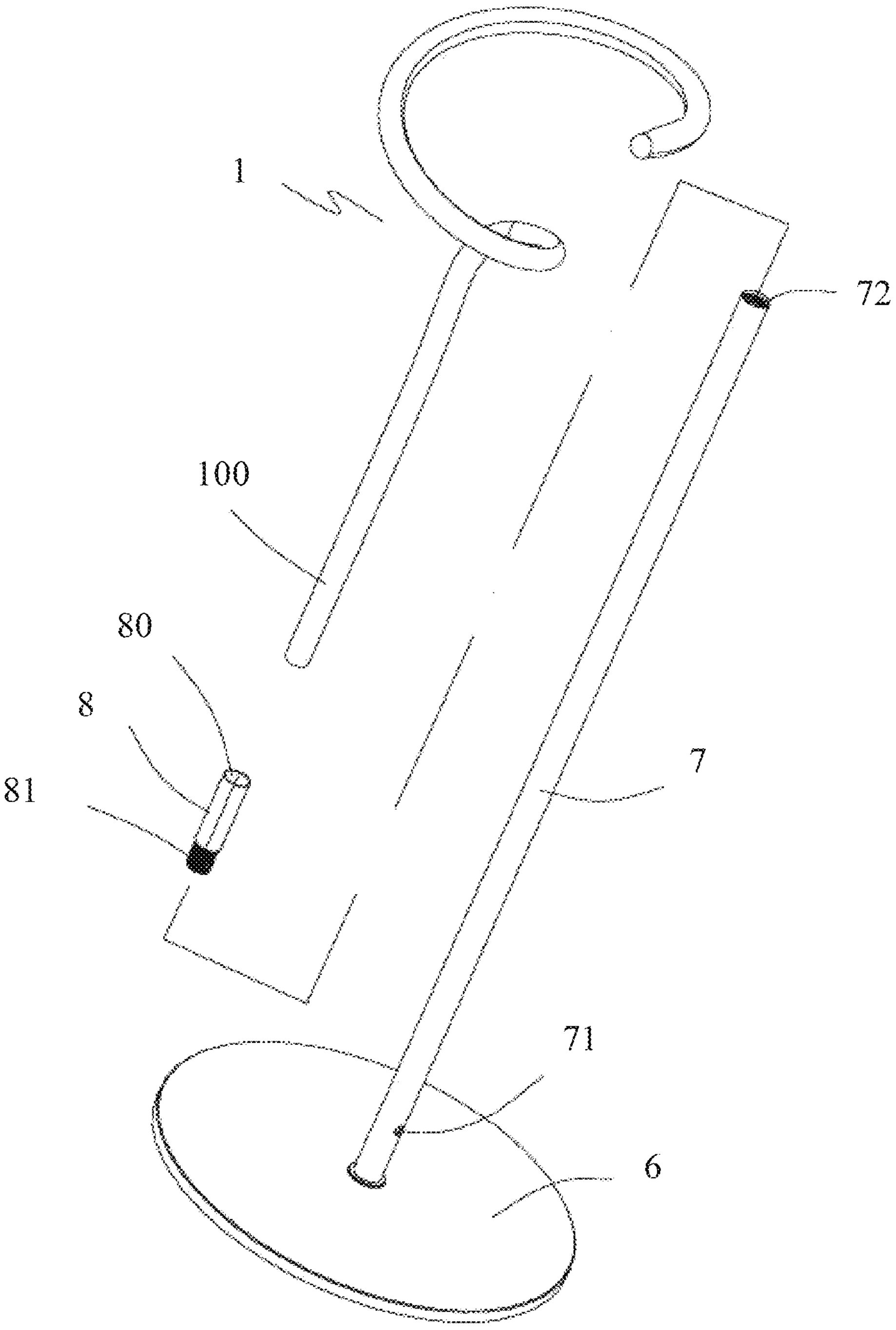
FIG. 23 is a schematic diagram illustrating a decomposition of an exemplary light fixture according to some embodiments of the present disclosure.
Figure 24:
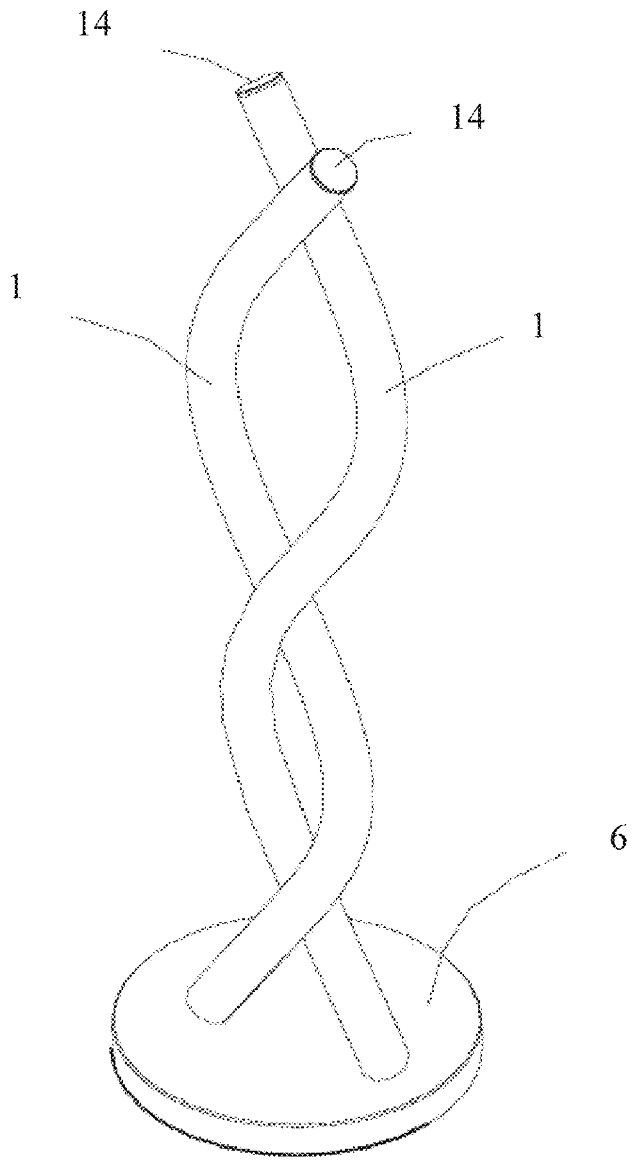
FIG. 24 is a schematic structural diagram illustrating an exemplary light fixture comprising two sets of light tubes disposed on a chassis according to some embodiments of the present disclosure.

FIG. 19 is a schematic diagram illustrating a front view of an exemplary light fixture comprising a light tube and a chassis according to some embodiments of the present disclosure. FIG. 20 is a cross-sectional view illustrating an exemplary light fixture comprising a light tube and a chassis according to some embodiments of the present disclosure. FIG. 21 is a decomposition diagram illustrating an exemplary light fixture comprising a light tube and a chassis according to some embodiments of the present disclosure. FIG. 22 is a schematic diagram illustrating a front view of an exemplary light fixture comprising a light tube, a mounting sleeve, and a chassis according to some embodiments of the present disclosure. FIG. 23 is a schematic diagram illustrating a decomposition of an exemplary light fixture according to some embodiments of the present disclosure. FIG. 24 is a schematic structural diagram illustrating an exemplary light fixture comprising two sets of light tubes disposed on a chassis according to some embodiments of the present disclosure.

In some embodiments, as illustrated in FIGS. 19-20, the light fixture may include a chassis 6 and a mounting sleeve 7. A lower end of the mounting sleeve 7 may be fixedly connected with the chassis 6. The connecting end 100 of the at least one tube member 1 may be sleeved with an upper end of the mounting sleeve 7. A threading through hole 71 communicated with an inner hole of the mounting sleeve 7 may be disposed in a radial direction of the mounting sleeve 7. A threading rubber sleeve 38 may be disposed in the threading through hole 71. The at least one flexible filament 2 may penetrate through the mounting sleeve via a cable to be electrically connected with a power cord through the threading rubber sleeve 38. More descriptions regarding the connecting end 100 of the tube member 1 may be found in FIGS. 14-18.

The chassis 6 refers to a disk-like structure for supporting the light tube. A lower surface of the chassis 6 may be a flat or concave surface, and an upper surface of the chassis 6 may be a flat or convex surface. For example, the upper and lower surfaces of the chassis 6 may be the flat surfaces, as illustrated in FIG. 19. A material of the chassis 6 may be a man-made material or a natural stone, a metal material, or a glass material, etc.

The mounting sleeve 7 refers to a sleeve structural member for mounting the tube member 1 on the base 9. The mounting sleeve 7 may have a hollow cavity. The mounting sleeve 7 and the base 9 may be connected in various ways, such as sleeved connection or fixed connection, or the base 9 and the mounting sleeve 7 may be manufactured as an integrated structure.

In some embodiments, one tube member 1 may be provided. The one tube member 1 may be mounted to the base 9 through the mounting sleeve 7, as illustrated in FIG. 22. In some embodiments, as illustrated in FIG. 24, two tube members 1 may be provided. The two tube members 1 may be mounted on the base 9 through the mounting sleeve 7. In some embodiments, three or more tube members 1 may be provided.

In some embodiments, the threading rubber sleeve 38 may be made of a material such as rubber. A middle of the threading rubber sleeve 38 may be provided with a hole.

In some embodiments, as illustrated in FIG. 21 and FIG. 23, the light fixture may further include a connecting sleeve 8. A lower end of the connecting sleeve 8 may be provided with outer threads 81. An upper inner hole of the connecting sleeve may be provided with a stepped sleeve hole 80. The connecting end 100 of the tube member 1 may be fixedly connected with the stepped sleeve hole 80. An upper inner hole of the mounting sleeve 7 may be provided with inner threads 72. The lower end of the connecting sleeve 8 may be screwed with the inner threads in the upper inner hole of the mounting sleeve 7. The tube member 1 may be connected with the mounting sleeve 7 through the connecting sleeve 8.

The stepped sleeve hole 80 refers to a stepped hole structure provided at an upper end of the connecting sleeve.

In some embodiments, a structure of the stepped sleeve hole 80 may be similar to that of the stepped sleeve. More descriptions regarding the structure of the stepped sleeve may be found in FIGS. 14-18 and related descriptions thereof.

The outer threads 81 disposed at the lower end of the connecting sleeve 8 may match the inner threads in the upper inner hole of the mounting sleeve 7.

By arranging the connecting sleeve, the connection between the tube member 1 and the mounting sleeve 7 can be more solid, thereby making the light fixture more stable.

In some embodiments, a length of the mounting sleeve 7 may be greater than or equal to 50 cm. The mounting sleeve 7 may be composed of a plurality of short sleeves connected in sequence. The threading through hole 71 may be disposed in tube walls of the plurality of short sleeves of a lower section of the mounting sleeve 7.

In some embodiments, the mounting sleeve 7 may be composed of the plurality short sleeves screwed in sequence through the threads. Lengths of the plurality short sleeves may be set as needed.

When the mounting sleeve 7 is too long, by setting the mounting sleeve 7 into the plurality of short sleeves, a situation in which the mounting sleeve 7 is too long and prone to breakage may be avoided. Meanwhile, the plurality of short sleeves may be combined to form different lengths of the mounting sleeve 7, which may satisfy different heights of the light fixture.

The light tube may be mounted on the chassis 6 through the mounting sleeve 7, and the threading through hole 36 and the threading rubber sleeve 38 may be disposed on the side of the mounting sleeve 7 for electrically connecting the at least one flexible filament 2 to the power cord. The light fixture obtained by the method described above may be used for a floor light fixture and a table light fixture without collapsing, demonstrating a high degree of stability. By arranging different counts of light tubes on the base 9, different shapes and lighting needs can be realized.

Figure 25:
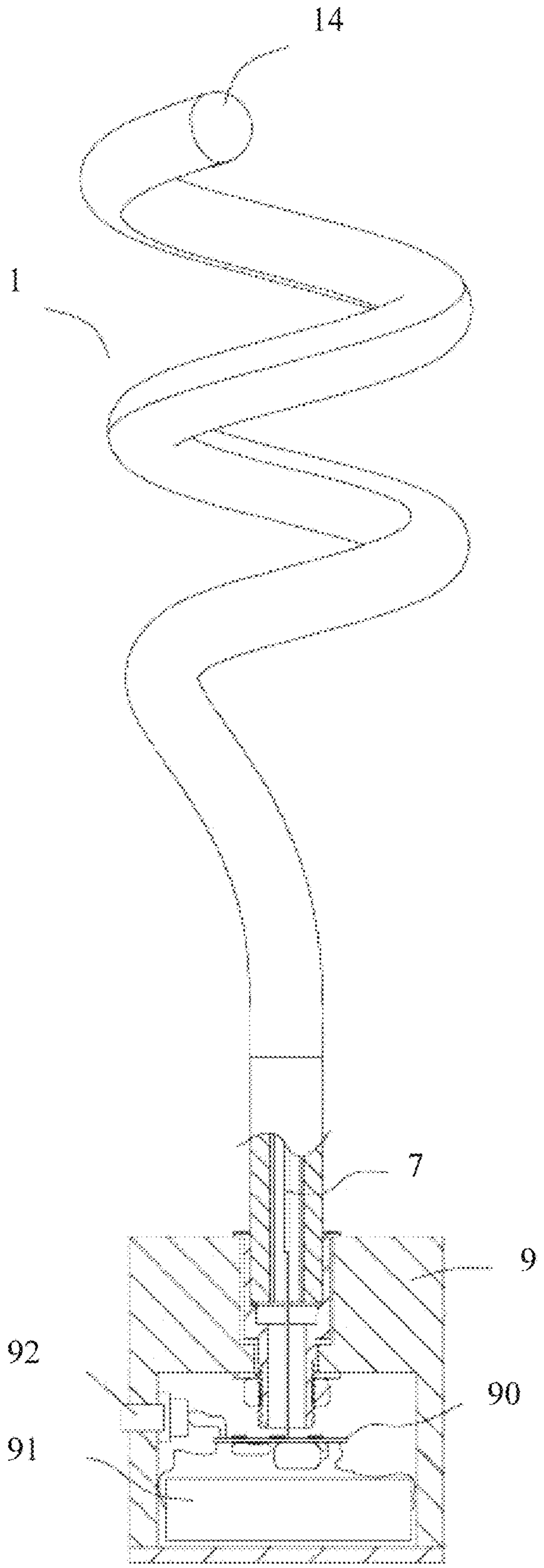
FIG. 25 is a schematic diagram illustrating an exemplary light fixture comprising a light tube, a base, a drive power board, and a power storage module according to some embodiments of the present disclosure.

FIG. 25 is a schematic diagram illustrating an exemplary light fixture comprising a light tube, a base, a drive power board, and a power storage module according to some embodiments of the present disclosure.

In some embodiments, as illustrated in FIG. 25, the light fixture may include the base 9. A drive power board 90 and a power storage module 91 may be disposed in the base 9. The connecting end 100 of the at least one tube member 1 may be mounted to the base 9. The at least one flexible filament 2 may penetrate through the base 9 via a cable to be electrically connected with the drive power board 90. The power storage module 91 may be electrically connected with the drive power board 90.

The base 9 refers to a structural component for mounting and supporting the light tube. The light tube may include the at least one tube member 1. The connecting end 100 of the at least one tube member 1 may be mounted on the base 9 in various ways, such as sleeved connection or fixed connection. For example, the at least one stepped through hole 31 may be disposed on the base 9, and the connecting end 100 of the tube member 1 may be sleeved with the stepped through hole 31 through the connecting sleeve 32 of the stepped structure. Descriptions regarding the structure and the arrangement of the at least one stepped through hole 31 and the connecting sleeve 32 may be found in FIGS. 14-18 and related descriptions thereof.

The base 9 may have an inner cavity structure for arranging the drive power board 90 and the power storage module 91.

The drive power board 90 refers to a structural component for controlling the electrical power output. For example, the drive power board 90 may control an output mode and an output current magnitude of current. The output mode of the current may be continuous output or intermittent output.

The power storage module 91 may be configured to provide power supply to the drive power board 90. The power storage module 91 may be configured as a device with power storage capability, such as a battery or a super capacitor. After being energized, the power storage module 91 and the drive power board 90 may form a circuit with the at least one flexible filament 2, thereby causing the at least one flexible filament 2 to emit light. In some embodiments, the light fixture may also be connected with the drive power board 90 and powered by an external power supply.

By arranging the drive power board and the power storage module, the light fixture can emit light without the external power supply, simplifying the structure of the light fixture. Meanwhile, the light fixture can be moved to any position for use, increasing application scenarios of the light fixture.

In some embodiments, as illustrated in FIG. 25, the switch 92 may be disposed on an outer wall of the base 9. The switch 92 may be electrically connected to a circuit formed by the power storage module 91, the drive power board 90, and the at least one flexible filament 2.

In some embodiments, the circuit may be controlled to be connected or disconnected by turning the switch 92 on or off, thereby controlling illumination of the at least one flexible filament 2.

In some embodiments, the drive power board 90 may include a plurality of preset modes, such as an off mode, an always-on mode, and a flicker mode. The different modes of the drive power board 90 may be switched by the switch 92.

Luminous states of the at least one flexible filament 2 may be controlled by arranging the switch 92, so that the light tube may be switched between different luminous states, thereby meeting diverse lighting needs.

Figure 26:
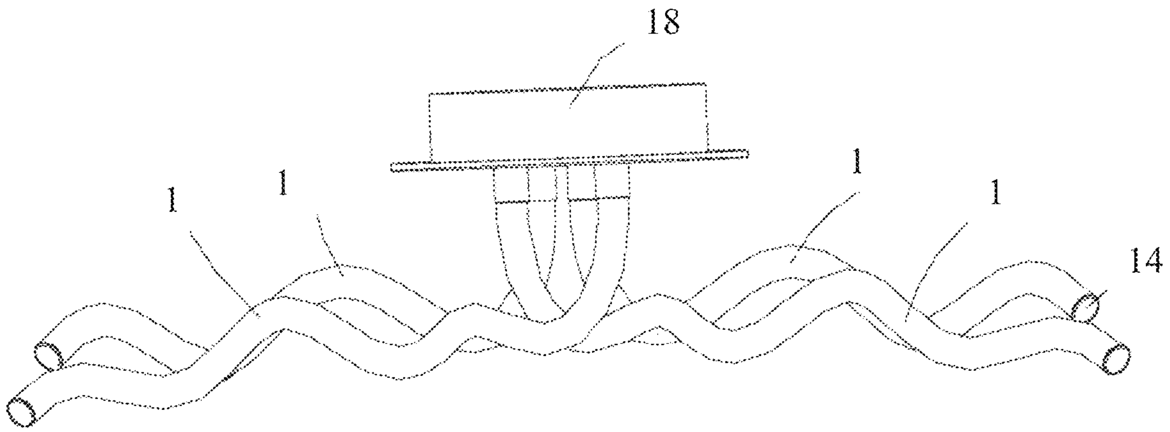
FIG. 26 is a schematic structural diagram illustrating an exemplary light fixture comprising a plurality of light tubes disposed on a lower side of a hanging base according to some embodiments of the present disclosure.

FIG. 26 is a schematic structural diagram illustrating an exemplary light fixture comprising a plurality of light tubes disposed on a lower side of a hanging base according to some embodiments of the present disclosure.

In some embodiments, the light fixture may include a hanging base 18. The hanging base 18 refers to a mounting base capable of being mounted to a ceiling.

In some embodiments, at least one of a sealed end and a connecting end of the at least one tube member 1 may be connected with the hanging base 18. For example, at least one of the sealed end and the connecting end of the at least one tube member 1 may be connected with the hanging base 18. In some embodiments, one of the sealed end and the connecting end not connected with the hanging base 18 may be provided with a plug 14. Descriptions regarding the plug 14 may be found in FIGS. 1-13 and the related descriptions thereof. As another example, the sealed end and the connecting end of the at least one tube member 1 may be connected with the hanging base 18, respectively.

For example, as illustrated in FIG. 26, one of the sealed end and the connecting end of each of the four tube members 1 may be connected with the hanging base 18, and the other of the sealed end and the connecting end of each of the four tube members 1 may be connected with the plug 14.

In some embodiments, the at least one tube member 1 and the hanging base 18 may be fixedly connected, such as threaded connection or welding, etc.

By arranging the hanging base, the light fixture can be applied to a ceiling lighting scenario.

Figure 27:
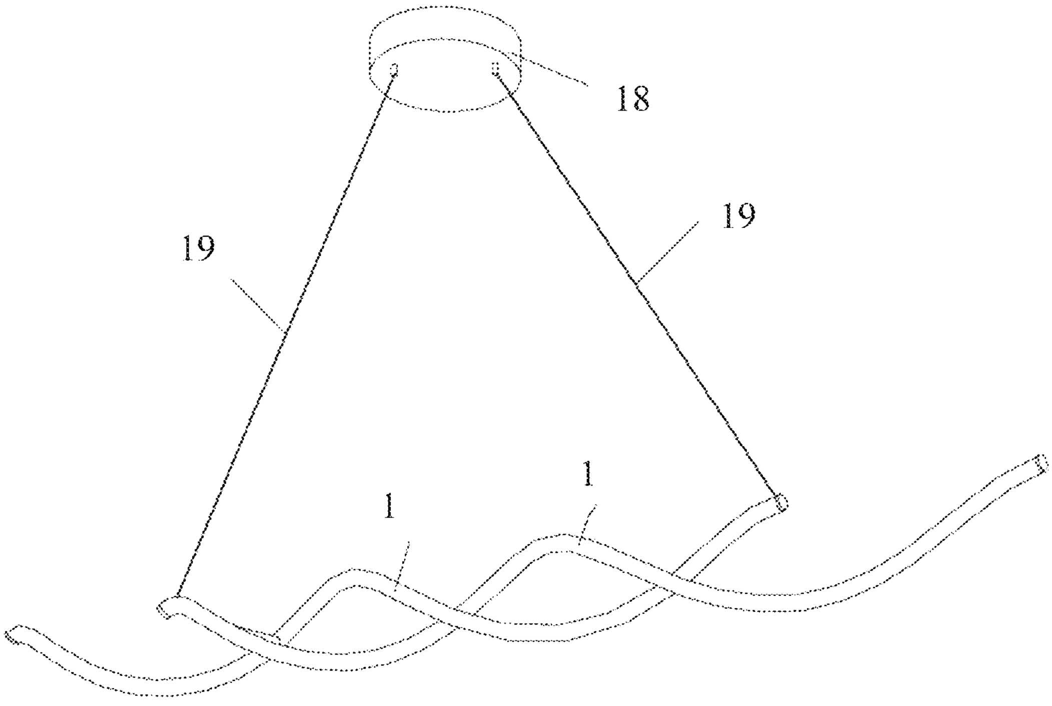
FIG. 27 is a schematic structural diagram illustrating an exemplary light fixture comprising a plurality of light tubes disposed below a hanging base according to some embodiments of the present disclosure.
Figure 28:
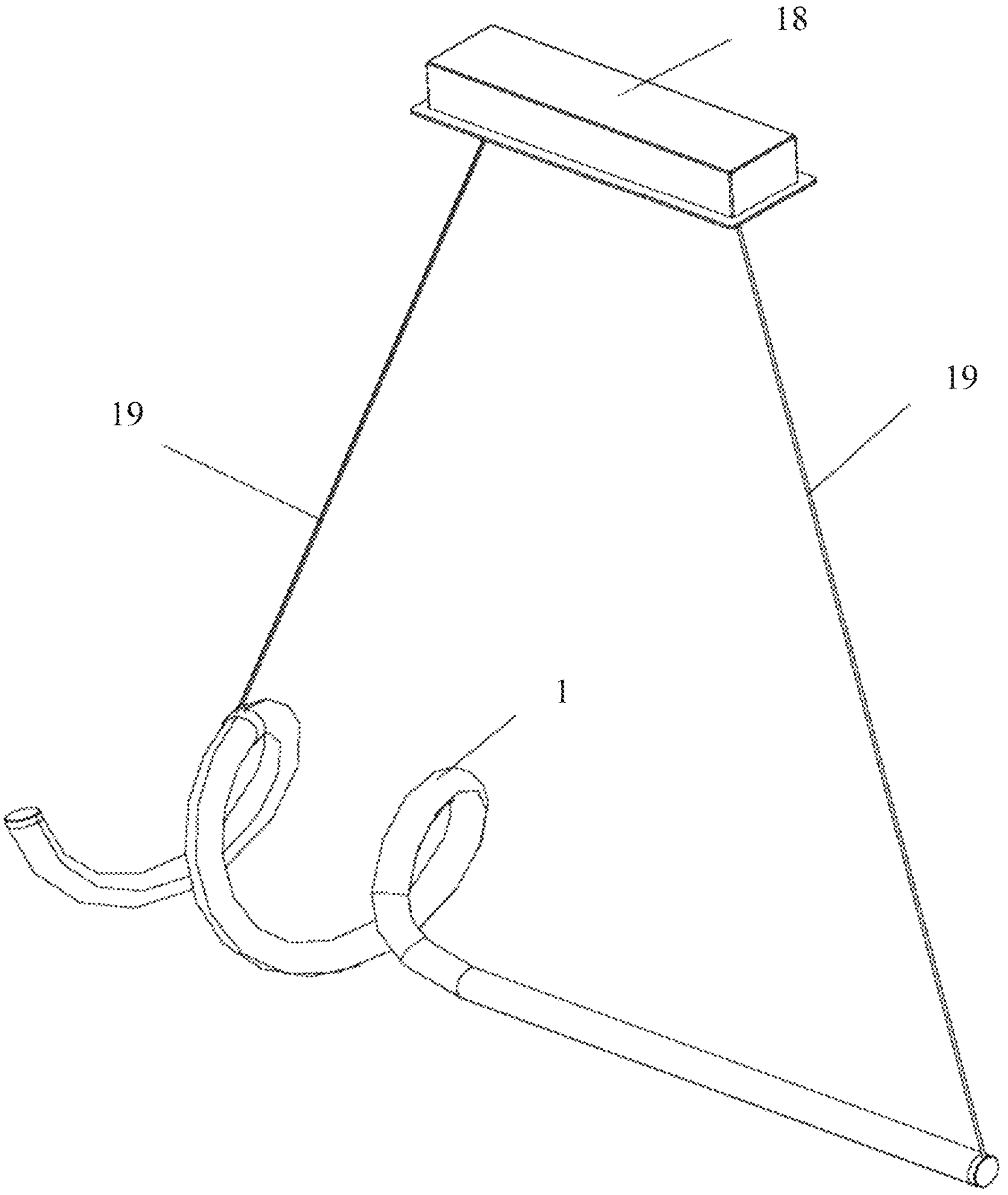
FIG. 28 is a schematic structural diagram illustrating an exemplary light fixture comprising a single light tube disposed below a hanging base according to some embodiments of the present disclosure.

FIG. 27 is a schematic structural diagram illustrating an exemplary light fixture comprising a plurality of light tubes disposed below a hanging base according to some embodiments of the present disclosure. FIG. 28 is a schematic structural diagram illustrating an exemplary light fixture comprising a single light tube disposed below a hanging base according to some embodiments of the present disclosure.

In some embodiments, the light fixture may include the hanging base 18 and at least one hanging sling 19.

The at least one hanging sling 19 refers to a rope structure for lifting the at least one tube member 1 to the hanging base 18. The at least one hanging sling 19 may be a rigid rope, such as a stainless steel rope or a steel wire rope. The at least one hanging sling 19 may also be a non-rigid rope, such as a nylon rope, etc. The at least one hanging sling 19 may be internally provided with a lead. The at least one flexible filament 2 disposed in the light tube may be electrically connected with the lead. The other end of the lead may penetrate into the hanging base 18.

The at least one tube member 1 may be hung below the hanging base 18 through the at least one hanging sling 19.

For example, the at least one tube member 1 may be hung below the hanging base 18 through one of the at least one hanging sling 19. As another example, the at least one tube member 1 may be hung below the hanging base 18 through two of the at least one hanging sling 19, respectively.

For example, as illustrated in FIG. 27, two of the at least one tube member 1 may be hung below the hanging base 18 through one of the at least one hanging sling 19, respectively, and the two of the at least one tube member 1 may be wrapped around each other to maintain balance. For example, as illustrated in FIG. 28, one of the at least one tube member 1 may be hung below the hanging base 18 through two of the at least one hanging sling 19, respectively.

By arranging the hanging base and the at least one hanging sling, the styling effect of the light fixture can be enhanced, and the light fixture can be better used in the ceiling lighting scenario.

It should be noted that the above description of the light fixture and the constituent parts thereof is only for convenience of description, and does not limit the present disclosure to the scope of the cited embodiments. It should be understood that for a person skilled in the art, after understanding the principle of the device, it is possible to make any combination of the constituent parts of the light fixture without departing from this principle.

Figure 29:
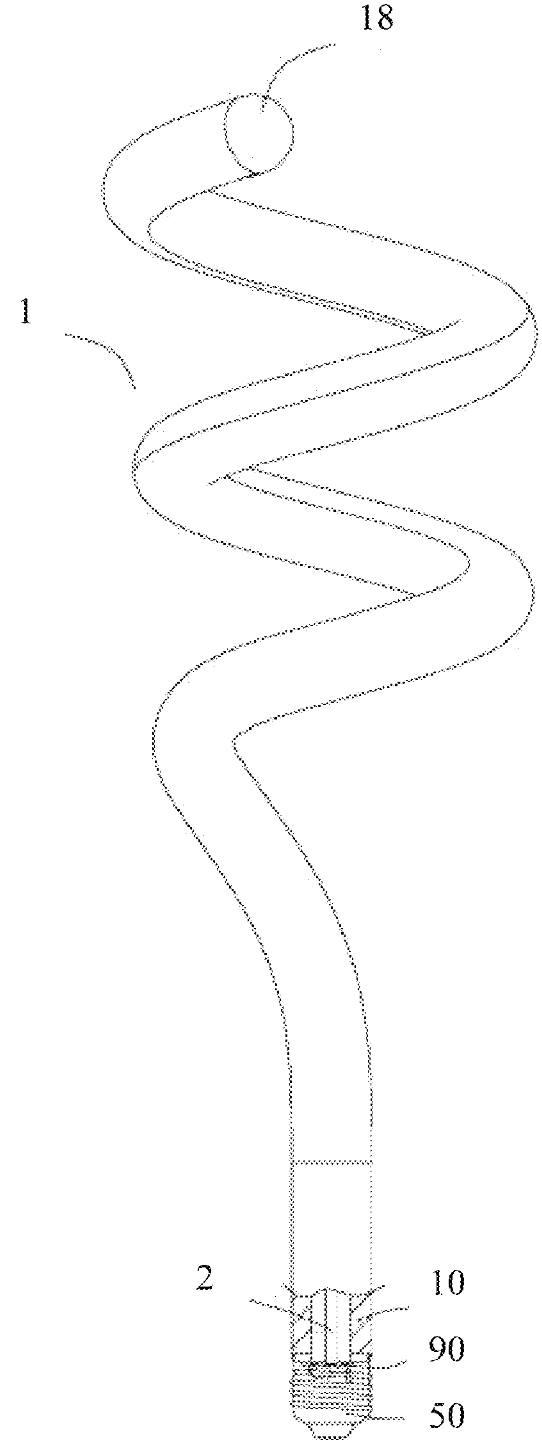
FIG. 29 is a schematic structural diagram illustrating an exemplary light body according to some embodiments of the present disclosure.

FIG. 29 is a schematic structural diagram illustrating an exemplary light body according to some embodiments of the present disclosure.

Some embodiments of the present disclosure provide a light body.

In some embodiments, the light body may include a light tube and a light cap 50, as illustrated in FIG. 29. The light tube may include the at least one flexible filament 2 and the at least one tube member 1. Description regarding the light tube, the at least one flexible filament 2 and the at least one tube member 1 may be found in FIG. 1-13.

The light cap 50 refers to a connecting structure disposed at an end of the light tube. In some embodiments, the light cap 50 may be connected with the connecting end 100 of the at least one tube member 1. The connection may include various connection modes, such as threaded connection or welding.

In some embodiments, an outer side of the light cap 50 may be provided with the outer threads 81. Meanwhile, a mounting base of the light tube may be provided with the inner threads 72 match the outer threads 81 of the light cap 50, thereby connecting the light tube with the mounting base by threading. The mounting base of the light tube may include the light holder 3, the chassis 6, the base 9, or the hanging base 18, etc., as illustrated in FIGS. 1-28.

In some embodiments, the drive power board 90 may be disposed in the light cap 50. The at least one flexible filament 2 may be connected with the drive power board 90. A positive pin and a negative pin of the drive power board 90 may be electrically connected with a top end and a side end of the light cap 50. In some embodiments, when alternating current (AC) is accessed to the at least one flexible filament 2, the drive power board 90 may convert the AC into a stable low-voltage direct current (DC) power supply. More descriptions regarding the drive power board 90 may be found in the related descriptions above.

In some embodiments of the present disclosure, by arranging the light cap on the light body, the light tube can be connected with the mounting base for conduction, thereby simplifying a connection structure between the light tube and the mounting base. The drive power board may be disposed in the light cap, the voltage and the current can be regulated so as to protect the light fixture.

It should be noted that the above description of the light body and the constituent parts thereof is for convenience of descriptions only, and does not limit the present disclosure to the scope of the cited embodiments. It should be understood that for a person skilled in the art, after understanding the principle of the device, it is possible to make any combination of the constituent parts of the light body without departing from this principle.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" may mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A light fixture, comprising a light holder and a light tube, wherein the light tube includes at least one flexible filament and at least one tube member, the at least one tube member includes a sealed end and a connecting end, the sealed end is connected with a plug, and the at least one tube member is mounted on the light holder through the connecting end; and a mounting cavity is disposed in the light holder, at least one stepped through hole is disposed in an upper end of the mounting cavity, the at least one stepped through hole is communicated with the mounting cavity, and the connecting end of the at least one tube member is fixedly connected with the stepped through hole through a connecting sleeve.

2. The light fixture of claim 1, wherein the connecting sleeve is a stepped sleeve, a hole diameter of an axial upper end of the connecting sleeve matches a diameter of the connecting end of the tube member, an axial lower end of the connecting sleeve extends into the mounting cavity through the stepped through hole;

the connecting sleeve is fixedly connected with the stepped through hole; and the flexible filament penetrates through the connecting sleeve and the light holder via a cable to be electrically connected with a power cord outside the light holder.

3. The light fixture of claim 2, wherein a threading hole communicated with the mounting cavity is disposed on the light holder, a rubber sleeve is connected in the threading hole, the flexible filament penetrates through the rubber sleeve via the cable to be electrically connected with the power cord outside the light holder.

4. The light fixture of claim 1, wherein the light fixture includes a chassis and a mounting sleeve, a lower end of the mounting sleeve is fixedly connected with the chassis, the connecting end of the at least one tube member is sleeved with an upper end of the mounting sleeve, a threading through hole communicated with an inner hole of the mounting sleeve is disposed in a radial direction of the mounting sleeve, and a threading rubber sleeve is disposed in the threading through hole; and the flexible filament penetrates through the mounting sleeve via a cable to be electrically connected with a power cord through the threading rubber sleeve.

5. The light fixture of claim 4, wherein a lower end of the connecting sleeve is provided with outer threads, an upper inner hole of the connecting sleeve is provided with a stepped sleeve hole, the connecting end of the tube member is fixedly connected with the stepped sleeve hole, an upper inner hole of the mounting sleeve is provided with inner threads, and the lower end of the connecting sleeve is screwed with the inner threads in the upper inner hole of the mounting sleeve.

6. The light fixture of claim 4, wherein a length of the mounting sleeve is greater than or equal to 50 cm, the mounting sleeve is composed of a plurality of short sleeves connected in sequence, and the threading through hole is disposed in tube walls of the plurality of short sleeves of a lower section of the mounting sleeve.

* * * * *